US010906097B2

(12) United States Patent
Enomura et al.

(10) Patent No.: US 10,906,097 B2
(45) Date of Patent: Feb. 2, 2021

(54) ULTRAVIOLET AND/OR NEAR-INFRARED BLOCKING AGENT COMPOSITION FOR TRANSPARENT MATERIAL

(71) Applicant: M. TECHNIQUE CO., LTD., Izumi (JP)

(72) Inventors: Masakazu Enomura, Izumi (JP); Daisuke Honda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 135 days.

(21) Appl. No.: 16/306,190

(22) PCT Filed: Feb. 21, 2017

(86) PCT No.: PCT/JP2017/006444
§ 371 (c)(1),
(2) Date: Nov. 30, 2018

(87) PCT Pub. No.: WO2017/208522
PCT Pub. Date: Dec. 7, 2017

(65) Prior Publication Data
US 2020/0231437 A1    Jul. 23, 2020

(30) Foreign Application Priority Data

Jun. 2, 2016   (JP) ................................ 2016-111346
Jun. 3, 2016   (WO) .................. PCT/JP2016/066542
(Continued)

(51) Int. Cl.
*C01B 13/14*   (2006.01)
*C09C 1/04*    (2006.01)
(Continued)

(52) U.S. Cl.
CPC .......... *B22F 1/0062* (2013.01); *B22F 1/0018* (2013.01); *C01B 13/14* (2013.01);
(Continued)

(58) Field of Classification Search
CPC ........................... B22F 2302/256; C01B 33/02
See application file for complete search history.

(56) References Cited

U.S. PATENT DOCUMENTS 9,346,685 B2   5/2016 Enomura
2004/0241189 A1   12/2004 Ishii et al.
(Continued)

FOREIGN PATENT DOCUMENTS

CN    1307970 C    4/2007
CN    101321816 A   12/2008
(Continued)

OTHER PUBLICATIONS

Extended European Search Report dated Oct. 31, 2019, for European Patent Application No. 17806084.4.
(Continued)

*Primary Examiner* — Alexandre F Ferre
(74) *Attorney, Agent, or Firm* — Birch, Stewart, Kolasch & Birch, LLP

(57) ABSTRACT

An object of the present invention is to provide an ultraviolet and/or near-infrared shielding agent composition for transparent material using silicon compound-coated silicon-doped zinc oxide particles that are controlled in properties in an ultraviolet region and/or a near-infrared region. The present invention provides an ultraviolet and/or near-infrared shielding agent composition for transparent material used for a purpose of shielding ultraviolet rays and/or near-infrared rays, the ultraviolet and/or near-infrared shielding agent composition for transparent material featuring that the ultraviolet and/or near-infrared shielding agent (Continued)

contains silicon compound-coated silicon-doped zinc oxide particles, with which surfaces of silicon-doped zinc oxide particles that are zinc oxide particles doped with at least silicon are at least partially coated with a silicon compound.

19 Claims, 12 Drawing Sheets

(30) Foreign Application Priority Data

| | | |
|---|---|---|
| Jun. 22, 2016 | (JP) | 2016-123800 |
| Oct. 5, 2016 | (WO) | PCT/JP2016/079700 |
| Oct. 5, 2016 | (WO) | PCT/JP2016/079709 |
| Oct. 5, 2016 | (WO) | PCT/JP2016/079710 |
| Nov. 7, 2016 | (WO) | PCT/JP2016/083001 |
| Nov. 29, 2016 | (WO) | PCT/JP2016/085460 |
| Feb. 2, 2017 | (WO) | PCT/JP2017/003876 |

(51) Int. Cl.

| | |
|---|---|
| C09C 3/06 | (2006.01) |
| B22F 1/00 | (2006.01) |
| C01G 49/06 | (2006.01) |
| C01G 9/02 | (2006.01) |
| C09C 1/24 | (2006.01) |
| C01B 33/02 | (2006.01) |
| C01B 33/32 | (2006.01) |
| C01G 53/00 | (2006.01) |
| C01F 17/206 | (2020.01) |
| C01G 49/02 | (2006.01) |
| C09D 7/62 | (2018.01) |
| C09C 3/12 | (2006.01) |
| C01G 23/04 | (2006.01) |

(52) U.S. Cl.
CPC .......... *C01B 13/145* (2013.01); *C01B 33/02* (2013.01); *C01B 33/325* (2013.01); *C01F 17/206* (2020.01); *C01G 9/02* (2013.01); *C01G 49/02* (2013.01); *C01G 49/06* (2013.01); *C01G 53/006* (2013.01); *C09C 1/043* (2013.01); *C09C 1/24* (2013.01); *C09C 3/06* (2013.01); *C09C 3/063* (2013.01); *C09C 3/12* (2013.01); *C09D 7/62* (2018.01); *B22F 2301/10* (2013.01); *B22F 2301/15* (2013.01); *B22F 2301/255* (2013.01); *B22F 2302/256* (2013.01); *B22F 2304/054* (2013.01); *B22F 2304/056* (2013.01); *C01G 23/04* (2013.01); *C01P 2002/01* (2013.01); *C01P 2002/02* (2013.01); *C01P 2002/70* (2013.01); *C01P 2002/72* (2013.01); *C01P 2002/82* (2013.01); *C01P 2004/03* (2013.01); *C01P 2004/04* (2013.01); *C01P 2004/50* (2013.01); *C01P 2004/62* (2013.01); *C01P 2004/64* (2013.01); *C01P 2004/80* (2013.01); *C01P 2006/60* (2013.01); *C01P 2006/62* (2013.01); *C01P 2006/66* (2013.01); *C01P 2006/90* (2013.01)

(56) References Cited

U.S. PATENT DOCUMENTS

| | | |
|---|---|---|
| 2006/0167138 A1 | 7/2006 | Ishii et al. |
| 2008/0248289 A1 | 10/2008 | Jonschker et al. |
| 2009/0080066 A1 | 3/2009 | Muromachi et al. |
| 2009/0233090 A1 | 9/2009 | Wong et al. |
| 2009/0274896 A1 | 11/2009 | Takeshi et al. |
| 2010/0008872 A1 | 1/2010 | Katusic et al. |
| 2010/0040567 A1 | 2/2010 | Katusic et al. |
| 2013/0034490 A1 | 2/2013 | Enomura |
| 2017/0130358 A1 | 5/2017 | Enomura |

FOREIGN PATENT DOCUMENTS

| | | |
|---|---|---|
| CN | 101374781 A | 2/2009 |
| CN | 101570641 A | 11/2009 |
| CN | 101583566 A | 11/2009 |
| CN | 103436111 A | 12/2013 |
| EP | 0 824 086 B1 | 5/2003 |
| EP | 1 975 133 A1 | 10/2008 |
| EP | 2 883 847 A1 | 6/2015 |
| JP | 2717103 B2 | 2/1998 |
| JP | H10-130021 A | 5/1998 |
| JP | 2004-059421 A | 2/2004 |
| JP | 2004-339396 A | 12/2004 |
| JP | 2007-031216 A | 2/2007 |
| JP | 2007-277018 A | 10/2007 |
| JP | 2009-112892 A | 5/2009 |
| JP | 2009-545509 A | 12/2009 |
| JP | 2010-508229 A | 3/2010 |
| JP | 2011-245474 A | 12/2011 |
| JP | 2013-087228 A | 5/2013 |
| JP | 2013-221049 A | 10/2013 |
| WO | WO 2007/059841 A1 | 5/2007 |
| WO | WO 2016/010018 A1 | 1/2016 |

OTHER PUBLICATIONS

International Search Report for PCT/JP2017/006444 (PCT/ISA/210) dated Apr. 25, 2017.

(a) HAADF (b) Si (c) Zn (d) O

ULTRAVIOLET AND/OR NEAR-INFRARED BLOCKING AGENT COMPOSITION FOR TRANSPARENT MATERIAL

TECHNICAL FIELD

The present invention relates to an ultraviolet and/or near-infrared blocking agent composition for transparent material.

BACKGROUND ART

Among light beams contained in sunlight or the like, ultraviolet rays cause damage to human skin, indoor and in-vehicle accessories or equipment, and near-infrared rays cause significant temperature rise indoors. Also, when near-infrared rays emitted by heating equipment installed in indoors escape outdoors, indoor temperature is lowered, and therefore transparent materials for gasses used in buildings, houses and other architectural structures, coating body such as buildings and vehicle, and clear coating films used in outer wall, signboards and equipment is not required only transparency, but also properties of shielding ultraviolet rays and/or near-infrared rays.

For such purpose, methods such as kneading various types of organic materials and oxide particles into a clear coating film, a film-like composition, an intermediate film used for a glass, or a glass itself, have been proposed. As for the material to absorb ultraviolet rays and near-infrared rays, for example, it is proposed to use an organic material represented by benzophenone, benzotriazole, methyl salicylate and the like, however, when the organic material is used in a composition for transparent material used for a purpose of blocking ultraviolet rays and/or near-infrared rays, there is a problem of weather resistance. That is, as time passes, decomposition of the organic material cannot be avoided and loss of transparency due to increase of turbidity, and reduction of absorption function of ultraviolet rays and near-infrared rays cannot be avoided.

On the other hand, it is known that near-infrared rays are absorbed by a metal oxide. For example, in Patent Document 1 or Patent Document 2, coating agent and coating material to apply on the surface of glass using tin-doped indium oxide fine particles and/or tin-doped antimony oxide fine particles as a metal oxide, titanium oxide fine particles or zinc oxide fine particles or cerium oxide fine particles as an ultraviolet-absorbing metal oxide have been proposed.

However, since indium and antimony are expensive rare metals, not only the cost readily becomes higher when it is used for glasses which occupy 30% to 80% of an area in buildings and wall surfaces, and for a clear coating film formed on a coating body such as buildings and vehicles, but also when the global environment is considered from the viewpoint of wastewater at the time of mining, waste ore or the like, it is difficult to solve the issue of reduction of environmental burdens. In the case of shielding near-infrared rays for the purpose of heat shielding, when a material that absorbs near-infrared rays is used for glass and clear coating film, in principle, half of the heat energy derived from near-infrared rays absorbed in the glass or the clear coating film can be shielded, but the other half of remaining is radiated in a direction where should be shielded.

For example, when heat rays are shielded by a glass using a near-infrared absorber, although half of the heat energy can be released outdoors, the other half of remaining is radiated indoors, therefore the actual heat-shielding effect is insufficient. That is, a material which has excellent reflection properties to near-infrared rays as well as no problems in terms of cost and environmental burdens in mining has been demanded. In consideration of transparency required for use as transparent material, zinc oxide particles may be considered as such a material. For example, as indicated in Patent Document 3 and Patent Document 4, zinc oxide particles are superior to ultraviolet absorption ability and are suitable as a material for transparent materials.

Now, generally, it can be said that ultraviolet absorption ability can absorb a lot of ultra violet rays with a small amount as absorption property per unit mass amount in a wavelength range of 200 nm to 380 nm is higher, that is, as a "molar absorption coefficient," is larger. Therefore, if the molar absorption coefficient is high, an ultraviolet absorption ability having as high as the present situation or higher than that of with small amount can be exhibited, thus it is possible to enhance the transparency of a transparent material such as coating film and film or glass or the like by reducing haze value.

However, in the conventional zinc oxide particles described in Patent Documents 3 and 4, although transparency of a fine particle dispersion body can be improved by atomization, the ability to absorb ultraviolet rays is low, thus it is difficult to completely absorb or shield ultraviolet rays in 380 nm or less, and if absorption or shielding is attempted, a large amount of ultrafine particles must be used per unit area, further, when using as coating film, because the film thickness becomes too thick as well as the amount of use is increased, it is impractical from the viewpoint of transparency and other problems. In addition, when atomization is performed to ensure transparency, there were cases that since photocatalytic activity rapidly improved by atomization could not be controlled, organic materials such as resin or the like contained in transparent material such as a film, a glass, or an intermediate film or clear coating film is decomposed to cause hazing and degradation of functions such as ultraviolet absorption and/or near-infrared reflection as time passed.

Thus, a method for coating surfaces of zinc oxide particles with silica to suppress the photocatalytic activity of the particles has been proposed (Patent Document 5). However, when conventional silica-coated zinc oxide particles are used for a transparent material in the same manner as zinc oxide not coated with silica, since the zinc oxide particles coated with silica are prepared by a general batch method and a separation rate of a silicon compound and an aggregation state of the zinc oxide particles which are differed depending on concentration and pH, or the like are not controlled, coating onto coarse aggregates is caused, so that the molar absorption coefficient especially in the wavelength range of 200 nm to 380 nm is not controlled so as to be increased. Accordingly, since the ability to absorb ultraviolet rays is low, there were cases in which not only the both transparency and ultraviolet absorption could not be achieved, but also the near-infrared shielding ability could not be sufficiently obtained.

Further, by the applicant of the present application, a method for producing monocrystalline zinc oxide particles is disclosed in Patent Document 6 and a method for producing zinc oxide particles whose doping element amount is controlled is disclosed in Patent Document 7. By using a forced thin-film microreactor which is allowed to mix between two processing surfaces that are capable of approaching to and separating from each other and rotate relative to each other, a raw material solution can be subjected to instantaneously mix, disperse, and react with separation solvent, and since the nanoparticles separated by the reaction in this forced thin film uniformly provide intended energy at a molecular level, it has an effect that the monocrystalline particles or particles having controlled doping element amount is readily obtained. However, the zinc oxide particles disclosed in Patent Document 6 and Patent Document 7 are not coated with silicon compound, therefore, the abovementioned influences due to photocatalytic activity are occurred. Further, the particles are not controlled so as to enhance the shielding ability due to the molar absorption coefficient in the ultraviolet region and the reflection of near-infrared rays. Consequently, with these conventional zinc oxide particles, when used as transparent material for glasses and clear coating films and the like, the zinc oxide particles thereof cannot solve the technical problems.

Further, with regard to zinc oxide which is actually required for use as an ultraviolet and/or near-infrared shielding agent composition, properly speaking, the ultraviolet absorption ability should be evaluated as an average molar absorption coefficient in the wavelength range of 200 nm to 380 nm and the near-infrared reflection ability should be evaluated as an average reflectance in a wavelength range of 780 nm to 2500 nm. However, in the prior arts, evaluation is made on transmittance to light beam in in the ultraviolet region, and made on only single wavelength, even in the average reflectance, the evaluation is not made in the near-infrared region. Consequently, when producing transparent material such as a glass, a clear coating film and the like by using the conventional zinc oxide particles, it has been extremely difficult to appropriately design an appropriate amount of an ultraviolet and/or near-infrared shielding agent to be formulated to obtain an intended ultraviolet and/or near-infrared shielding agent composition.

PRIOR ART DOCUMENTS

Patent Documents

Patent Document 1: Japanese Patent Laid-Open Publication No. 2013-221049
Patent Document 2: Japanese Patent Laid-Open Publication No. 2013-87228
Patent Document 3: Japanese Patent No. 2717103
Patent Document 4: Japanese Patent Laid-Open Publication No. 2007-031216
Patent Document 5: Japanese Patent Laid-Open Publication No. 2004-59421
Patent Document 6: International Patent Laid-Open Publication No. WO 2016/010018
Patent Document 7: Japanese Patent Laid-Open Publication No. 2011-245474

DISCLOSURE OF INVENTION

Problems to be Solved by the Invention

Under the circumstance as mentioned above, the present invention has an object to provide an ultraviolet and/or near-infrared shielding agent composition for transparent material using silicon compound-coated silicon-doped zinc oxide particle that is controlled properties in an ultraviolet region and/or a near-infrared region. That is, the object is to provide an ultraviolet and/or near-infrared shielding agent composition for transparent material which is suitable as a composition for transparent material and uses silicon compound-coated silicon-doped zinc oxide particle that is controlled in ultraviolet absorption ability and/or near-infrared reflection ability, by coating zinc oxide particles with a silicon compound and controlling a molar ratio (Si/Zn) of zinc (Zn) and silicon (Si) of silicon-doped zinc oxide particles to maximally improve original properties of zinc oxide in the respective regions of ultraviolet, visible, and near-infrared and compensate for such properties.

Means for Solving the Problems

The present inventors have found that a molar ratio (Si/Zn) of zinc (Zn) and silicon (Si) of silicon-doped zinc oxide particles included in silicon compound-coated silicon-doped zinc oxide particles has relevance to color characteristics, such as transmission properties, absorption properties, and reflection properties of the silicon compound-coated silicon-doped zinc oxide particles, further have found that the silicon compound-coated silicon-doped zinc oxide particle that is controlled these properties is suitable for a composition for transparent material, and thus, the present inventors have completed the present invention.

More specifically, the present invention is an ultraviolet and/or near-infrared shielding agent composition for transparent material, wherein an ultraviolet and/or near-infrared shielding agent composition for transparent material used for a purpose of shielding ultraviolet rays and/or near-infrared rays, wherein the ultraviolet and/or near-infrared shielding agent contains silicon compound-coated silicon-doped zinc oxide particle in which at least part of a surface of silicon-doped zinc oxide particle which is doped with at least silicon in a zinc oxide particle is coated with a silicon compound.

In the present invention, preferably, the ultraviolet and/or near-infrared shielding agent composition for transparent material is an ultraviolet and/or near-infrared shielding agent composition for transparent material is an ultraviolet and/or near-infrared shielding agent composition for glass.

In the present invention, preferably, the ultraviolet and/or near-infrared shielding agent composition for transparent material is an ultraviolet and/or near-infrared shielding agent composition for transparent material is an ultraviolet and/or near-infrared shielding agent composition for clear coating film.

Also, the present invention is preferably an ultraviolet and/or near-infrared shielding agent composition for transparent material, wherein the silicon compound-coated silicon-doped zinc oxide particle is the silicon compound-coated silicon-doped zinc oxide particle in which a molar ratio (Si/Zn) of zinc (Zn) and silicon (Si) in the silicon-doped zinc oxide particle is controlled so as to be increased, wherein the silicon compound-coated silicon-doped zinc oxide particle is controlled so as to increase an average molar absorption coefficient in a wavelength region of 200 nm to 380 nm of a dispersion solution in which the silicon compound-coated silicon-doped zinc oxide particle is dispersed in a dispersion medium.

Also, the present invention is preferably an ultraviolet and/or near-infrared shielding agent composition for transparent material, wherein the silicon compound-coated silicon-doped zinc oxide particle is the silicon compound-coated silicon-doped zinc oxide particle in which the molar ratio (Si/Zn) is controlled so as to be decreased, wherein the silicon compound-coated silicon-doped zinc oxide particle is controlled so as to increase an average reflectance in a wavelength region of 780 nm to 2500 nm of the silicon compound-coated silicon-doped zinc oxide particle.

Also, the present invention is preferably an ultraviolet and/or near-infrared shielding agent composition for transparent material that contains at least two kinds of the silicon compound-coated silicon-doped zinc oxide particles in which a molar ratio (Si/Zn) of zinc (Zn) and silicon (Si) in the silicon-doped zinc oxide particles is different.

Also, the present invention is preferably an ultraviolet and/or near-infrared shielding agent composition for transparent material, wherein the silicon compound-coated silicon-doped zinc oxide particle is the silicon compound-coated silicon-doped zinc oxide particle that is controlled so as to be decreased a ratio of M-OH bond, which is bonding of one or two or more different elements (M) other than oxygen or hydrogen with hydroxyl group (OH), contained in the silicon compound-coated silicon-doped zinc oxide particle, or a ratio of Si—OH bond, which is bonding of silicon (Si) with the hydroxyl group (OH) contained in the silicon compound, and the silicon compound-coated silicon-doped zinc oxide particle is controlled so as to be increased at least any of an average reflectance in a wavelength region of 780 nm to 2500 nm or an average molar absorption coefficient in a wavelength region of 200 nm to 380 nm of a dispersion solution, in which the silicon compound-coated silicon-doped zinc oxide particle is dispersed in a dispersion medium.

Also, the present invention is preferably an ultraviolet and/or near-infrared shielding agent composition for transparent material, wherein the ratio of the M-OH bond is calculated by waveform separation of peak derived from the silicon compound-coated silicon-doped zinc oxide at wavenumbers of 100 $cm^{-1}$ to 1250 $cm^{-1}$ in an infrared absorption spectrum and the silicon compound-coated silicon-doped zinc oxide particle is silicon compound-coated silicon-doped zinc oxide particle that is controlled an area ratio of a peak derived from the M-OH bond separated waveform to a total area of the respective waveform-separated peaks.

Also, the present invention is preferably an ultraviolet and/or near-infrared shielding agent composition for transparent material, wherein the ratio of the Si—OH bond is calculated by waveform separation of peak derived from the silicon compound at wavenumbers of 800 $cm^{-1}$ to 1250 $cm^{-1}$ in an infrared absorption spectrum and the silicon compound-coated silicon-doped zinc oxide particle is silicon compound-coated silicon-doped zinc oxide particle that is controlled an area ratio of a peak derived from the Si—OH bond separated waveform to a total area of the respective waveform-separated peaks.

Also, the present invention is preferably an ultraviolet and/or near-infrared shielding agent composition for transparent material, wherein the silicon compound-coated silicon-doped zinc oxide particle is silicon compound-coated silicon-doped zinc oxide particle being controlled under a state of a dispersion body in which the ratio of the M-OH bond or the ratio of the Si—OH bond contained in the silicon compound-coated silicon-doped zinc oxide particle is dispersed in a dispersion medium.

Also, the present invention is preferably an ultraviolet and/or near-infrared shielding agent composition for transparent material, wherein the dispersion body is a coating film, a film form, or a glass, and is heat-treated, wherein the silicon compound-coated silicon-doped zinc oxide particle is the silicon compound-coated silicon-doped zinc oxide particle in which the average reflectance or the average molar absorption coefficient is controlled by the heat treatment.

Also, the present invention is preferably an ultraviolet and/or near-infrared shielding agent composition for transparent material, wherein the silicon compound-coated silicon-doped zinc oxide particle is the silicon compound-coated silicon-doped zinc oxide particle which is coated with silicon compound at least part of the surface of a single zinc oxide particle or the surface of the agglomerate body formed by aggregation of plural silicon-doped zinc oxide particles, and the silicon compound-coated silicon-doped zinc oxide particle is the silicon compound-coated silicon-doped zinc oxide particle in which a particle diameter of the silicon-doped zinc oxide particle or the aggregate body of the silicon-doped zinc oxide particles is 1 nm or more and 100 nm or less.

The present invention may be embodied as an ultraviolet and/or near-infrared shielding agent composition for transparent material which contains the silicon compound-coated silicon-doped zinc oxide particle which is an amorphous silicon oxide.

Advantageous Effects of the Invention

According to the present invention, an ultraviolet and/or near-infrared shielding agent composition for transparent material that is suitable for glass applications and clear coating film applications can be provided by containing silicon compound-coated silicon-doped zinc oxide particle in which at least part of the surface of silicon-doped zinc oxide particle is coated with a silicon compound in an ultraviolet and/or near-infrared shielding agent composition for transparent material used for the purpose of shielding ultraviolet rays and/or near-infrared rays. In particular, the control of the molar ratio (Si/Zn) of zinc (Zn) and silicon (Si) of the silicon compound-coated silicon-doped zinc oxide particles allows to control the average molar absorption coefficient in the wavelength range of 200 nm to 380 nm or the average reflectance in the wavelength range of 780 nm to 2500 nm so that more precise design of composition can be easily made for the use of diversifying the transparent materials and target properties as compared with the conventional ones. In particular, by adapting the silicon compound-coated silicon-doped zinc oxide particles of the present invention to a composition for transparent material such as a composition for glass or composition for clear coating film, an ultraviolet and/or near-infrared shielding agent composition for transparent material can be provided which can be effectively used for glass having high transparency and not impairing the designability of products as well as a material to be coated.

Figure 7:
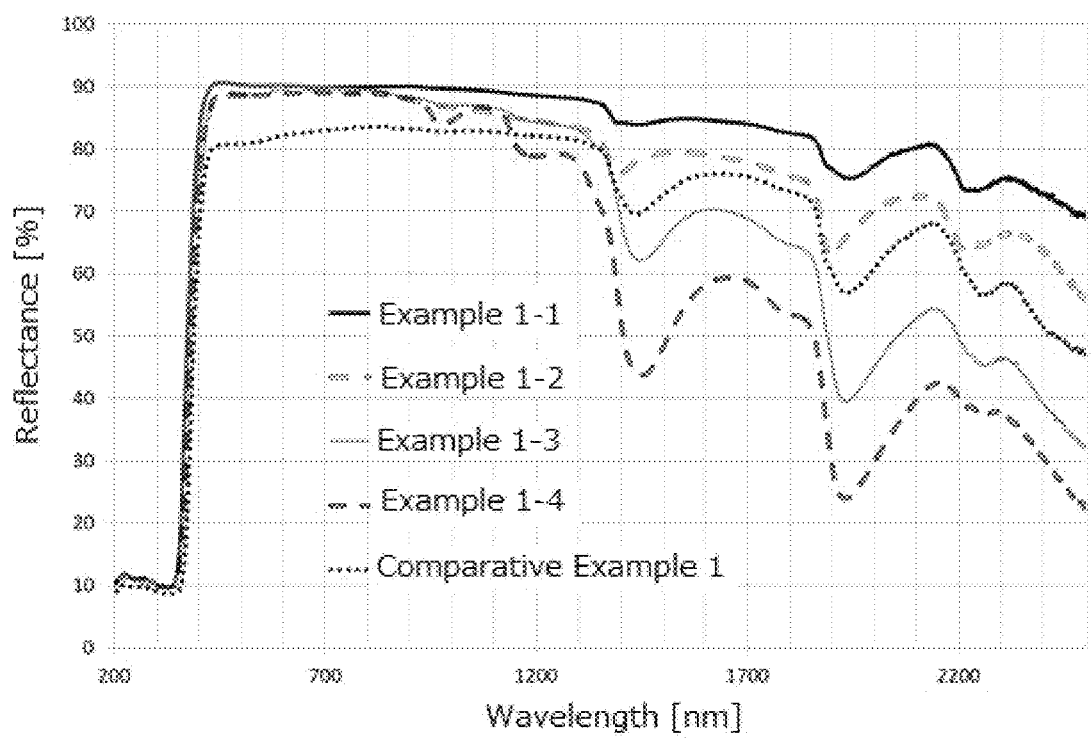

FIG. 7 is the reflectance measurement results of the silicon compound-coated silicon-doped zinc oxide particle obtained in Example 1-1 to Example 1-4 and the zinc oxide particle obtained in Comparative Example 1.

Figure 8:
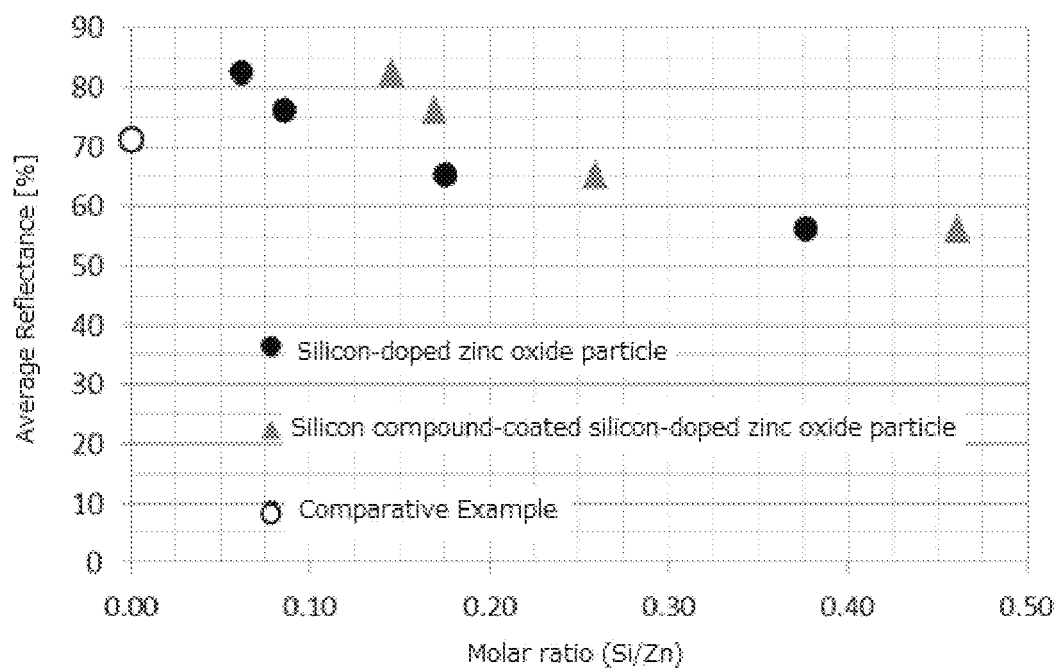

FIG. 8 is the graph of average reflectance in a wavelength region of 780 nm to 2500 nm to molar ratios (Si/Zn) of the silicon compound-coated silicon-doped zinc oxide particles obtained in Example 1-1 to Example 1-4 and the zinc oxide particle obtained in Comparative Example 1.

Figure 9:
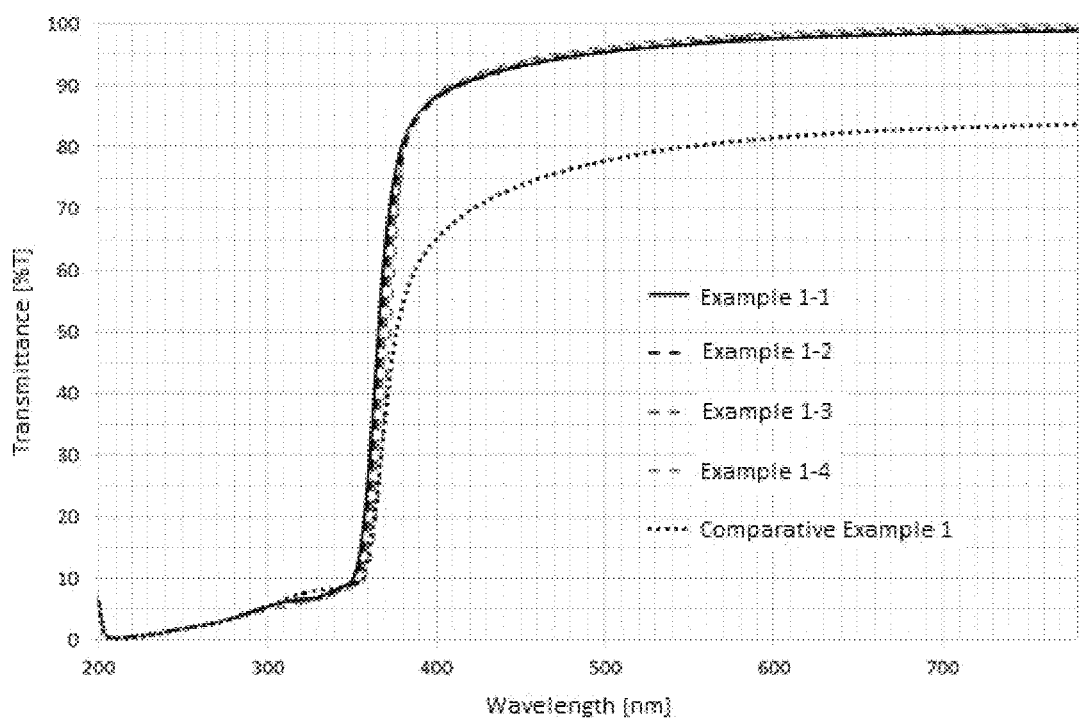

FIG. 9 is the graph of transmittances of the dispersion solution in which the silicon compound-coated silicon-doped zinc oxide particles obtained in Example 1-1 to Example 1-4 and the zinc oxide particle obtained in Comparative Example 1 are dispersed in propylene glycol.

Figure 10:
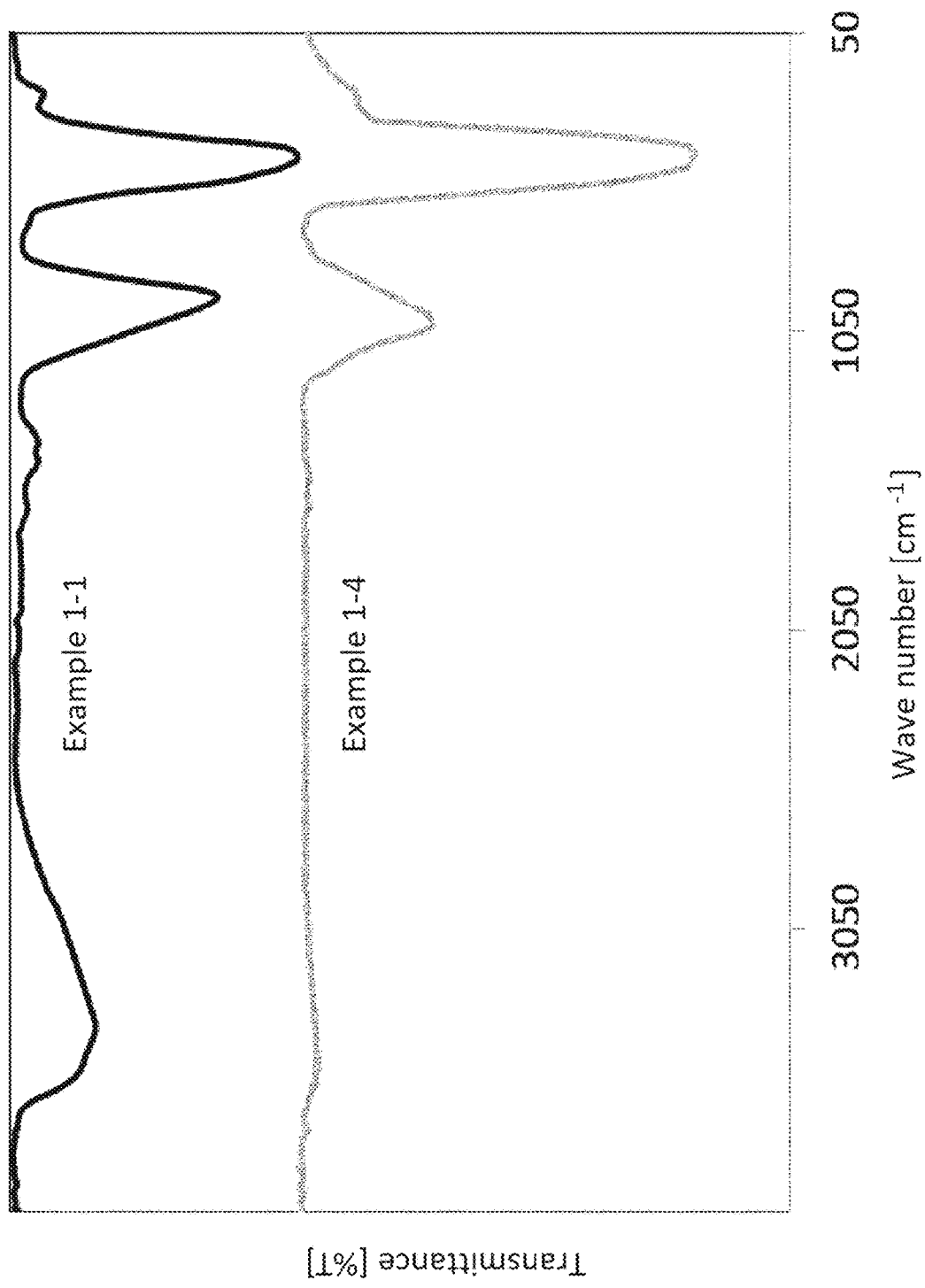

FIG. 10 is the IR measurement results of the silicon compound-coated silicon-doped zinc oxide particles respectively obtained in Example 1-1 to Example 1-4.

Figure 11:
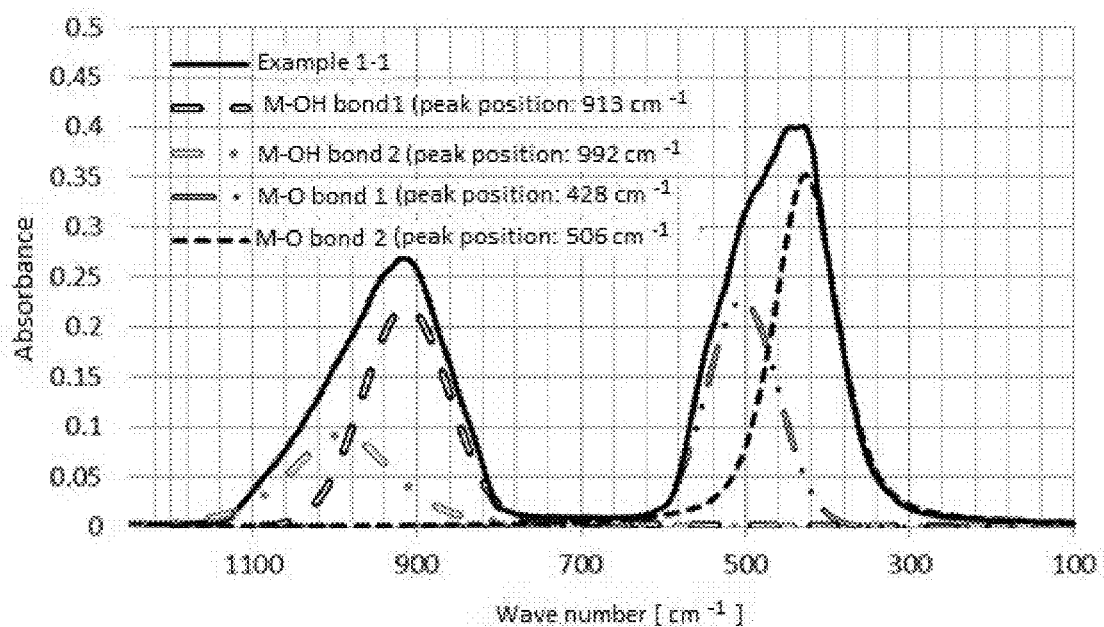

FIG. 11 is the waveform separation results in a wavenumber region of 100 $cm^{-1}$ to 2500 $cm^{-1}$ of the IR measurement results of the silicon compound-coated silicon-doped zinc oxide particles obtained in Example 1-1.

Figure 12:
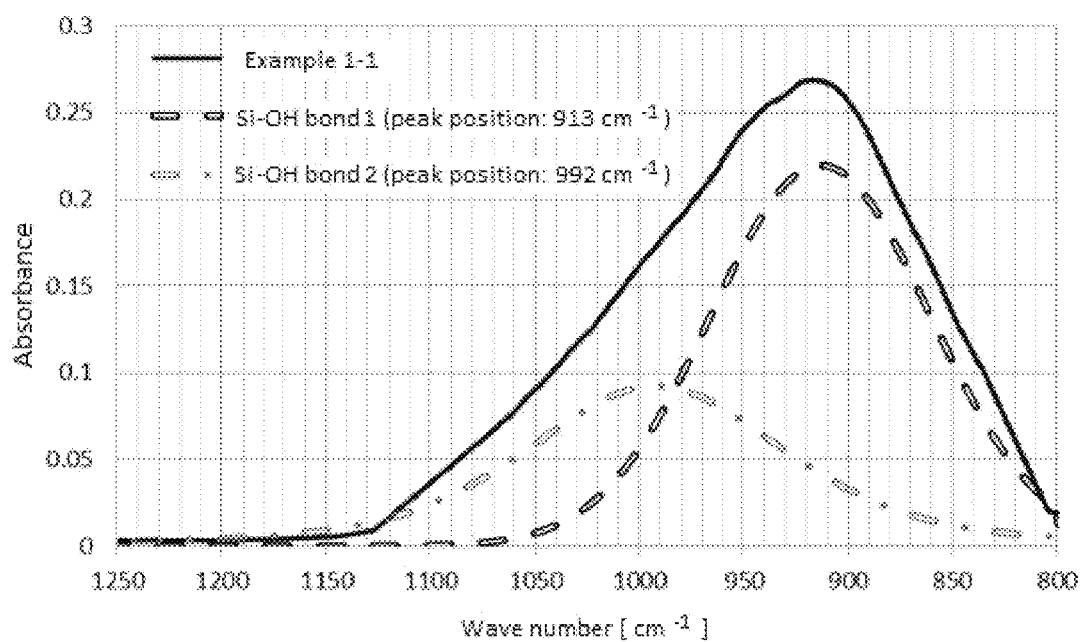

FIG. 12 is the waveform separation results in a wavenumber region of 800 $cm^{-1}$ to 1250 $cm^{-1}$ of the IR measurement results of the silicon compound-coated silicon-doped zinc oxide particles obtained in Example 1-1.

BEST MODE FOR CARRYING OUT THE INVENTION

Hereinafter, one example of the embodiments of the present invention will be explained on the basis of the drawings. Meanwhile, the aspect of the present invention is not limited to the embodiments described below.

(Composition for Transparent Material)

A composition for transparent material according to the present invention is a composition for use in a coating body, a glass, a transparent resin, or a film-like composition in which transparency is required. For example, it is included compositions contained in a glass, a transparent resin, or a clear coating film itself, a composition contained in an intermediate film in a laminated glass, a film-like composition used in a film or the like that is combined with a glass by adhesion or the like to the glass or a transparent resin, and paints for coating on a glass. In the case of use as a material for a glass or a transparent resin, an ultraviolet and/or near-infrared shielding agent composition for glass that is suitable for effectively shielding ultraviolet rays or near-infrared rays according to purpose can by obtained by using methods such as directly kneading into a glass, a pre-cured glass or a transparent resin, or mixing with composition for forming a membrane or film for various glasses. An illustrative examples of the transparent resin include such as PMMA (polymethylmethacrylate), PC (polycarbonate), PET (polyethylene terephthalate), and the like.

When the composition for transparent material is a composition for clear coating film, by using the ultraviolet and/or near-infrared shielding agent for transparent material of the present invention as a paint or the like to form a clear coating film, it can be made into the ultraviolet and/or 0 near-infrared shielding agent composition for clear coating film as well as clear coating film using the ultraviolet and/or near-infrared shielding agent for transparent material according to the present invention can be formed on a coating body, such as an architectural structure, an automobile, an outer wall, or a signboard on which the paint is used. Other than the above, the composition for transparent material according to the present invention is the composition for transparent material that is suitable for a purpose of shielding ultraviolet rays and/or near-infrared rays.

(Silicon Compound-Coated Silicon-Doped Zinc Oxide Particles)

In the present invention, the silicon compound-coated silicon-doped zinc oxide particle which is the ultraviolet and/or near-infrared shielding agent for transparent material is the silicon compound-coated silicon-doped zinc oxide particle in which at least part of the surface of silicon-doped zinc oxide particle is coated with a silicon compound, and the silicon compound-coated silicon-doped zinc oxide particle is preferably controlled by controlling a molar ratio (Si/Zn) of zinc (Zn) and silicon (Si) of the silicon-doped zinc oxide particle in the silicon compound-coated silicon-doped zinc oxide particle, in particular the molar ratio (Si/Zn) of zinc (Zn) and silicon (Si) of the silicon-doped zinc oxide particles that are not coated with silicon, an average reflectance in a wavelength region of 780 nm to 2500 nm and/or an average molar absorption coefficient in a wavelength region of 200 nm to 380 nm of a dispersion solution, in which the silicon compound-coated silicon-doped zinc oxide particle is dispersed in a dispersion medium, and further, and the silicon compound-coated silicon-doped zinc oxide particle in the present invention can be used as a material for a glass itself or can be used as a material contained in a film or the like to be combined with a glass, such as by adhering onto the glass, or in a paint or the like or a clear coating film for coating onto a glass.

(Embodiment of Silicon Compound-Coated Silicon-Doped Zinc Oxide Particle—1)

The silicon compound-coated silicon-doped zinc oxide particle to the present invention is not limited to those only composed of the silicon compound and the silicon-doped zinc oxide particle. It may also be carried out as the embodiment in which a material other than the above is included therein with the amount thereof to a degree not affecting the present invention. For example, it may be carried out not only as the silicon-doped zinc oxide particle containing other elements therein, but also as composite oxide particle containing a compound other than the silicon-doped zinc oxide. Illustrative example of the material other than the above include hydroxide, nitride, carbide, various salts such as nitrate and sulfate, hydrate, and organic solvate.

(Embodiment of Silicon Compound-Coated Silicon-Doped Zinc Oxide Particles—2)

Figure 1:
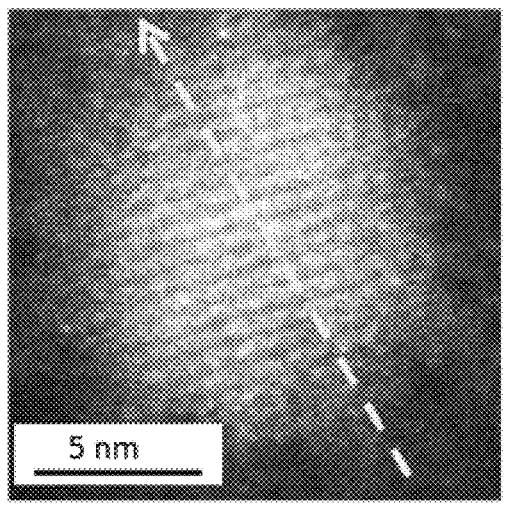
FIG. 1 shows the STEM picture and mapping result of the silicon compound-coated silicon-doped zinc oxide particle obtained in Example 1-1.
Figure 1:
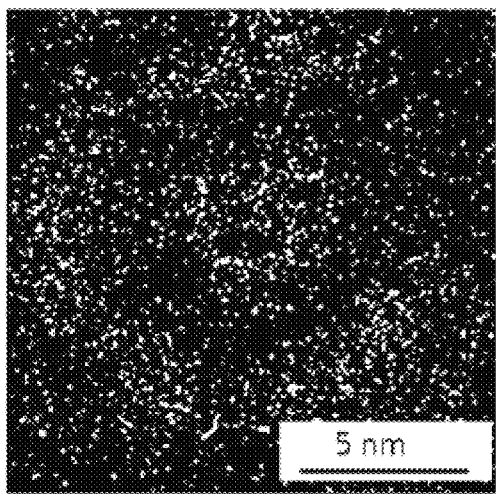
Figure 1:
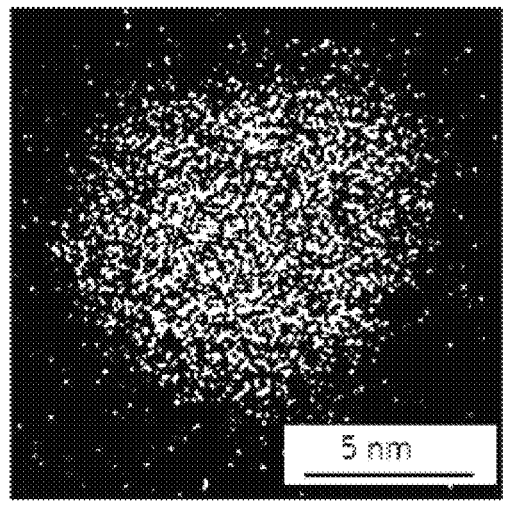
Figure 1:
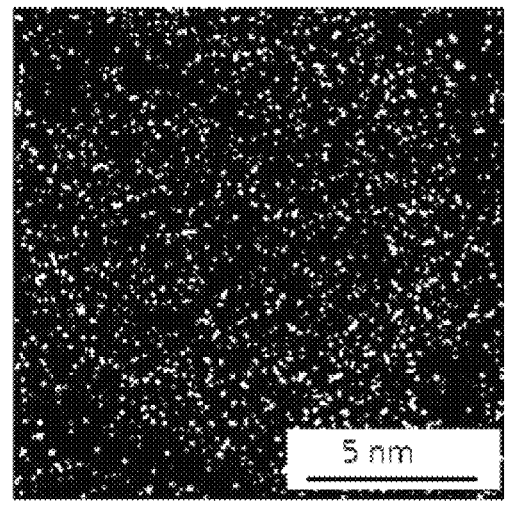
Figure 2:
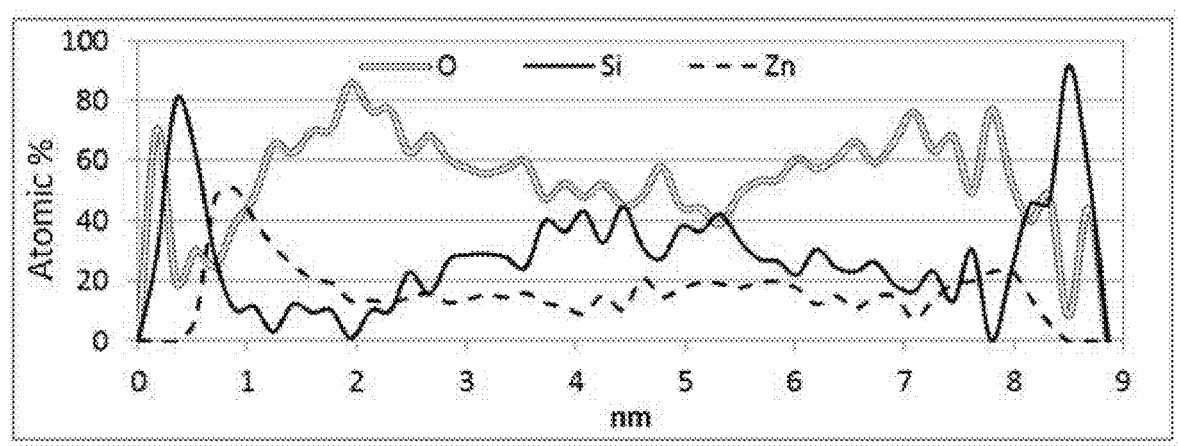
FIG. 2 is the line analysis results of the silicon compound-coated silicon-doped zinc oxide particle obtained in Example 1-1.
Figure 3:
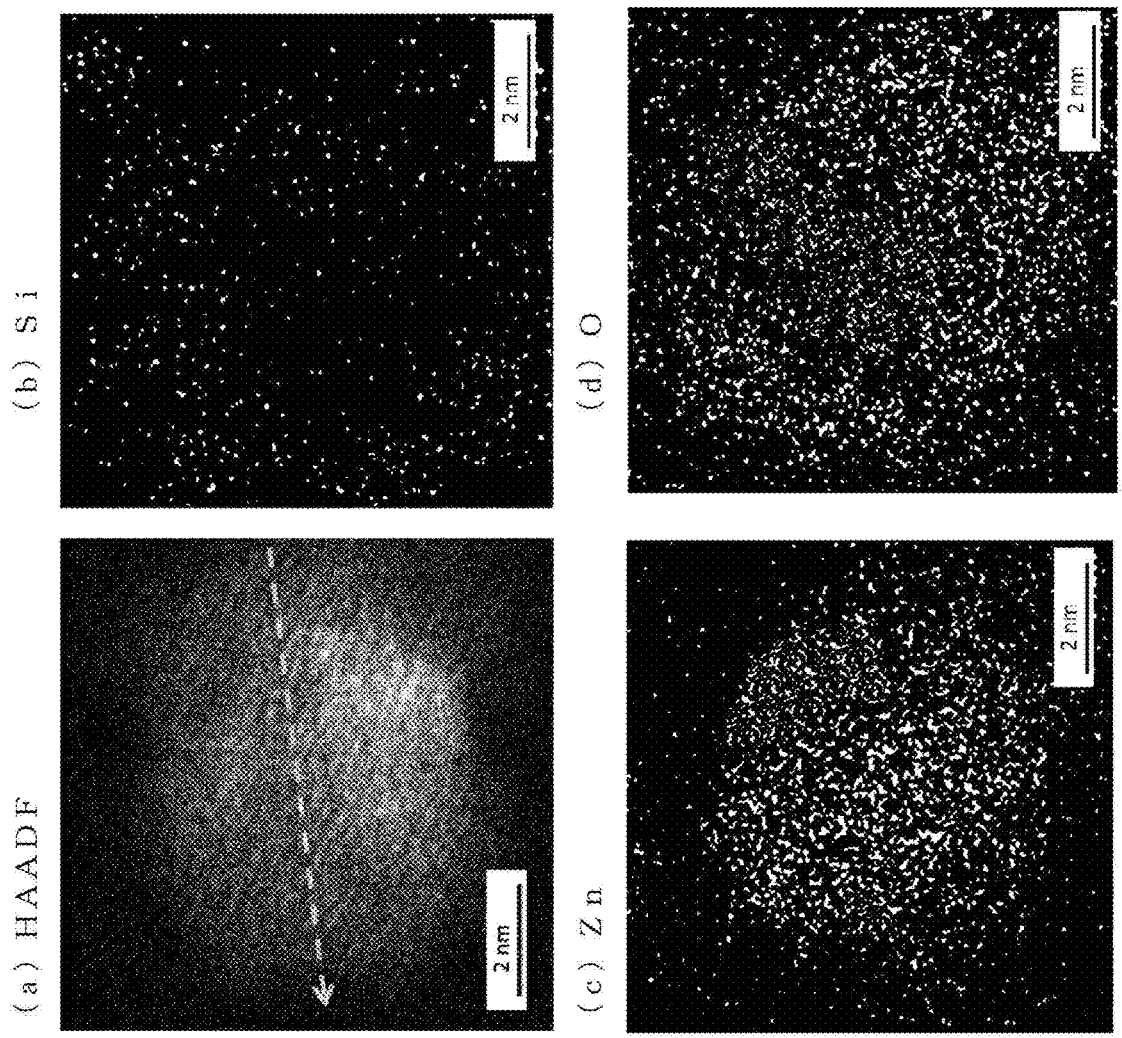
FIG. 3 shows the STEM picture and mapping result of the silicon compound-coated silicon-doped zinc oxide particle obtained in Example 4-4.
Figure 4:
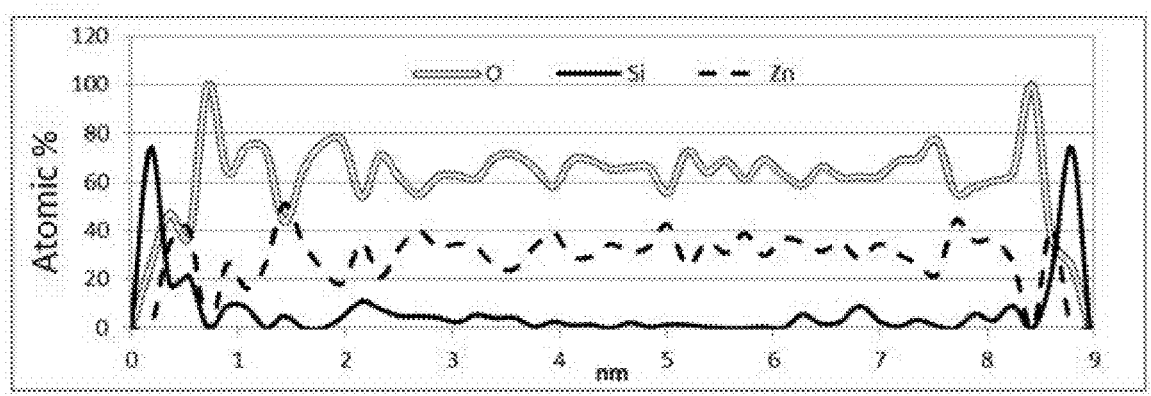
FIG. 4 is the line analysis result of the silicon compound-coated silicon-doped zinc oxide particle obtained in Example 4-4.

As one example of the silicon compound-coated silicon-doped zinc oxide particle of the present invention, a silicon compound-coated silicon-doped zinc oxide particle in which at least part of the surface of the silicon-doped zinc oxide particle obtained in Example 1-1 to be described later is coated with a silicon oxide, which is one of silicon compounds, will be described. FIG. 1 is the mapping result using STEM of the silicon compound-coated silicon-doped zinc oxide particle obtained in Example 1-1. FIG. 1 shows the mapping results of (a) a dark field image (HAADF image), (b) silicon (Si), (c) zinc (Zn), and (d) oxygen (O), respectively. As can be seen in FIG. 1, silicon and oxygen are detected in the entire particle, while zinc is detected smaller particle than silicon and oxygen. That is, silicon is mainly detected on the surface of the particle. However, silicon and zinc are detected randomly in the inside of the particle, it can be understood that the surface of the silicon-doped zinc oxide particle whose inside the particle is doped with Si is coated with the silicon compound. FIG. 2 is the result of the line analysis of the HAADF image of FIG. 1 at the position of the dotted line, wherein the atom % (mol %) of the elements detected in the line portions from one edge to the other edge of the particle is shown. As can be seen in FIG. 2, oxygen and silicon are detected in the range to the both edges of the line analysis; on the other hand, zinc is not detected to 0.5 nanometers inside from the edge of the particle. Therefore, it can be seen that at least part of the surface of the silicon-doped zinc oxide particle is coated with a silicon oxide. In FIG. 3, the mapping result using STEM of the silicon compound-coated silicon-doped zinc oxide particle obtained in Example 4-4 to be described later is shown; and in FIG. 4, the line analysis result of the HAADF image of FIG. 3 at the position of the dotted line is shown. As can be seen in FIG. 3 and FIG. 4, also for the particle obtained in Example 4-4, silicon which is considered to be derived from the silicon compound is mainly detected on the surface, on the contrary to Example 1-1, a part where silicon is not detected can be seen in the inside of the particle. That is, as compared with the silicon compound-coated silicon-doped zinc oxide particle obtained in Example 1-1, it is understood that the silicon compound-coated silicon-doped zinc oxide particle is controlled so that the molar ratio (Si/Zn) of silicon (Si) to zinc (Zn) in a vicinity of a surface layer is increased as compared with the inside of the silicon compound-coated silicon-doped zinc oxide particle. Therefore, as one example of the silicon compound-coated silicon-doped zinc oxide particle of the present invention, the embodiment may be carried out as the silicon compound-coated silicon-doped zinc oxide particle in which at least part of the surface of the silicon-doped zinc oxide particle is coated with a silicon compound. However, in order to use a composition for transparent material for a glass or a clear coating film, photocatalytic activity generated due to atomization of zinc oxide particle or silicon-doped zinc oxide particle is required to be suppressed by coating the at least part of the surfaces of the particle. Further, by coating the surfaces of zinc oxide particle with the silicon compound, an advantage of enabling water resistance and chemical stability, such as acid resistance and alkali resistance, to be imparted to the zinc oxide is provided.

(Embodiment of Silicon Compound-Coated Silicon-Doped Zinc Oxide Particles—3: XRD Measurement Results—1)

Figure 5:
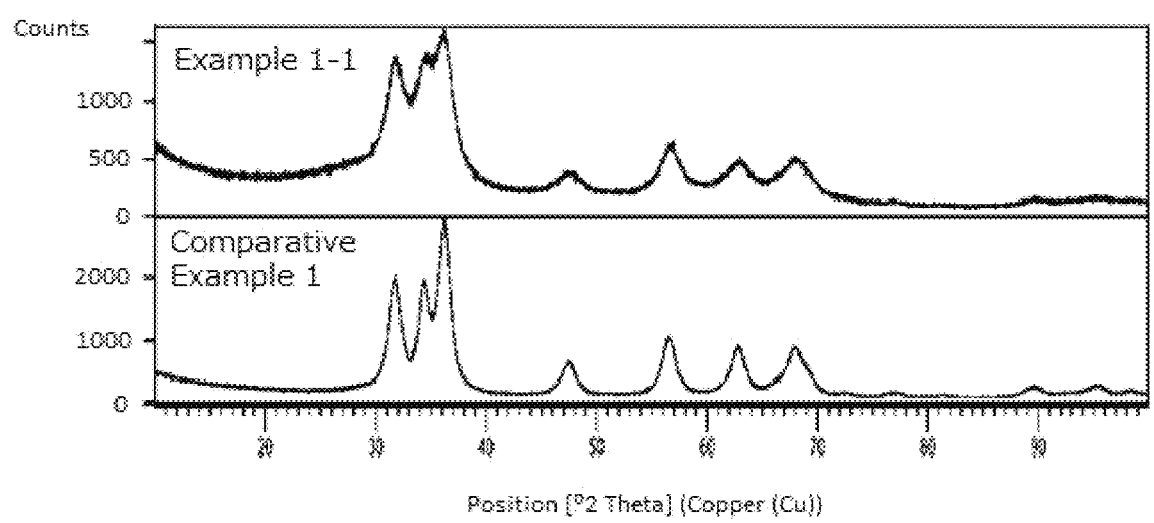
FIG. 5 is the XRD measurement results of the silicon compound-coated silicon-doped zinc oxide particle obtained in Example 1-1 and zinc oxide particle obtained in Comparative Example 1.

In FIG. 5, the XRD measurement results of the silicon compound-coated silicon-doped zinc oxide particle obtained in Example 1-1 and XRD measurement results of zinc oxide particle obtained in Comparative Example 1 are shown. As can be seen FIG. 5, whereas ZnO peak is clearly detected in the XRD measurement results of the zinc oxide particle obtained in Comparative Example 1, the peak is detected as broad peaks in Example 1-1, and it is considered that there is a possibility that strain is generated in ZnO crystal due to incorporation of Si in the inside of the particle. Thus, as one example thereof, the silicon compound-coated silicon-doped zinc oxide particle of the present invention can be embodied as silicon compound-coated silicon-doped zinc oxide particle containing at least silicon in the inside of the particle, and as can be seen from the STEM picture shown above, the silicon-doped zinc oxide particle not being coated the surface of particle is preferably silicon zinc solid solution oxide particle.

(Control of Molar Ratio (Si/Zn) and Color Characteristics)

In the present invention, by controlling the molar ratio (Si/Zn) of zinc (Zn) and silicon (Si) contained in the silicon compound-coated silicon-doped zinc oxide particle, color characteristics such as reflectance and the average reflectance to the light beam in the wavelength of 780 nm to 2500 nm t of the near-infrared region or molar absorption coefficient and the average molar absorption coefficient to the light beam in the wavelength of 200 nm to 380 nm of the ultraviolet region can be controlled accurately and precisely, and the silicon compound-coated silicon-doped zinc oxide particle suitable for especially used in a composition for transparent material can be provided. The control of these color characteristics can be performed even more precisely by combination of control of the amount of hydroxyl group contained in the silicon compound-coated silicon-doped zinc oxide particle later described.

(Color Characteristic: Average Molar Absorption Coefficient)

The molar absorption coefficient can be calculated by the following equation 1 from the absorbance and the molar concentration of the substance to be measured in the measurement sample, in the UV-visible absorption spectroscopic measurement.

$$\varepsilon = A/(c \cdot 1) \quad \text{(Equation 1)}$$

Meanwhile, $\varepsilon$ is a substance-specific constant, called a molar absorption coefficient, which is the absorbance of a dispersion solution with the thickness of 1 cm and the concentration of 1 mol/L; and thus the unit thereof is L/(mol·cm). And, A is the absorbance in the UV-visible absorption spectroscopic measurement, and c is the sample's molar concentration (mol/L). And 1 is the length of the transmitting light (optical path length: cm), which is usually a cell thickness upon measuring the UV-visible absorption spectrum. In the present invention, in order to show the capacity to absorb the light beam in the UV region of 200 nm to 380 nm, a simple average of each molar absorption coefficient in the entire measured wavelength of 200 nm to 380 nm is calculated so as to evaluate as the average molar absorption coefficient.

(Color Characteristic: Average Reflectance or Average Transmittance)

The average reflectance to the light beam in the wavelength of 780 nm to 2500 nm means a simple average value of each reflectance in the entire measured wavelength of the refection spectrum with the wavelength range of 780 nm to 2500 nm. The average transmittance with the wavelength range of 380 nm to 780 nm means a simple average of each transmittance in the entire measured wavelength of the transmission spectrum with the wavelength range of 380 nm to 780 nm.

In the average molar absorption coefficient, the average reflectance, and the average transmittance, the wavelength ranges thereof are not limited to those described above, so that the wavelength range in which the average values are obtained may be appropriately determined in accordance with the target color characteristics.

(Average Molar Absorption Coefficient increasing Rate)

Further, with respect to the average molar absorption coefficient in the wavelength region of 200 nm to 380 nm of the silicon compound-coated silicon-doped zinc oxide particle, it is preferable that the silicon compound-coated silicon-doped zinc oxide particle not coated the surface of particle with the silicon compound, further is preferable that the silicon compound-coated silicon-doped zinc oxide particle whose "average molar absorption coefficient increasing rate", which is the increasing rate to the average molar absorption coefficient in the same wavelength region of zinc oxide particle being not doped with silicon be controlled.

(Specific Embodiment of the Molar Absorption)

Figure 6:
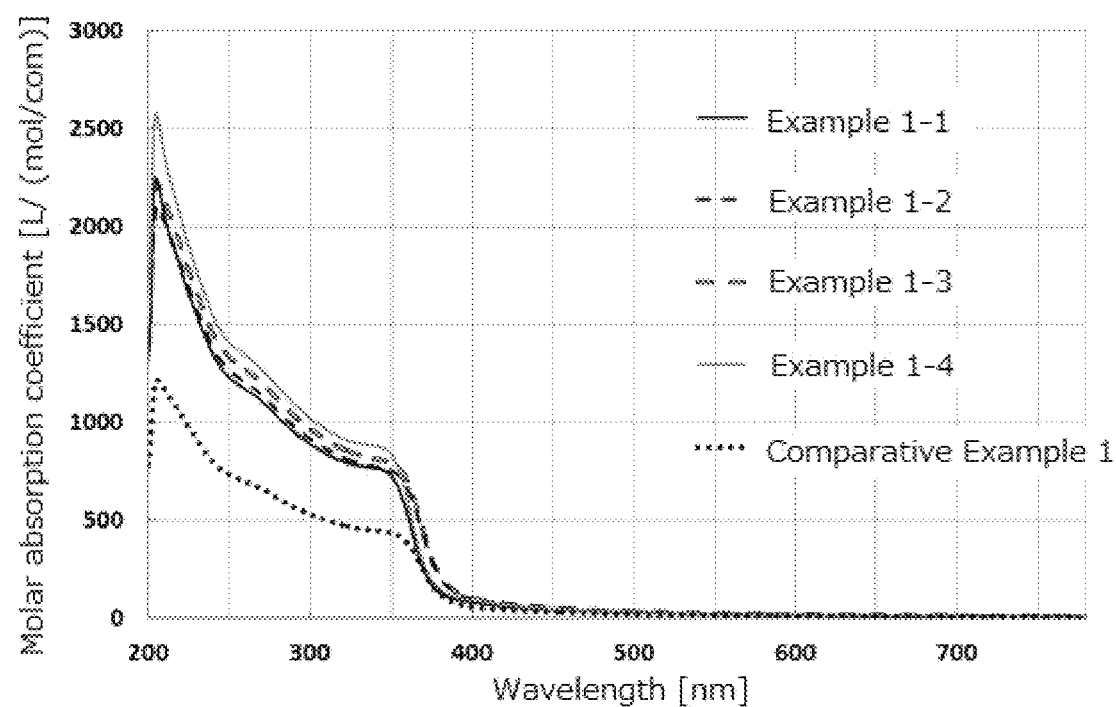
FIG. 6 is the graph of molar absorption coefficients of dispersion solution in which the silicon compound-coated silicon-doped zinc oxide particles obtained in Example 1-1 to Example 1-4 and the zinc oxide particle obtained in Comparative Example 1 are respectively dispersed in propylene glycol.

FIG. 6 shows a graph of molar absorption coefficient of the silicon compound-coated silicon-doped zinc oxide particle obtained in Example 1-2 to Example 1-4 which is prepared by changing the molar ratio (Si/Zn) of silicon (Si) to zinc (Zn) contained in Example 1-1 and the silicon compound-coated silicon-doped zinc oxide particle as well as a graph of molar absorption coefficient of dispersion solution in the wavelength range of 200 nm to 380 nm obtained by dispersing the zinc oxide particle not being doped thereof into propylene glycol. The average primary particle diameters of silicon-doped zinc oxide particles obtained in Example 1-1 to Example 1-4 and the zinc oxide particle obtained in Comparative Example 1 are in a range of 8.5 nm to 9.0 nm under all conditions and may be considered that specific surface areas are constant. The molar ratios (Si/Zn) are in the order of Example 1-1<Example 1-2<Example 1-3<Example 1-4. As can be seen FIG. 6, it can be understood that the molar absorption coefficient in the wavelength range of 200 nm to 380 nm of the silicon compound-coated silicon-doped zinc oxide particle is increased as compared to those of zinc oxide particle obtained in Comparative Example 1. The silicon compound-coated silicon-doped zinc oxide particle of the present invention is the silicon compound-coated silicon-doped zinc oxide particle in which the average molar absorption coefficient in the wavelength range of 200 nm to 380 nm of a dispersion solution obtained by dispersing the silicon compound-coated silicon-doped zinc oxide particle into a dispersion medium is not coated with the silicon compound, and further is controlled so as to be higher (to be increased) as compared to that of zinc oxide particle not being doped with the silicon compound, and is preferably the silicon compound-coated silicon-doped zinc oxide particle in which the average molar absorption coefficient in the wavelength range of 200 nm to 380 nm is controlled so as to be higher (to be increased) by controlling the molar ratio (Si/Zn) so as to be higher (to be increased). Further, it is preferable that the silicon compound-coated silicon-doped zinc oxide particle be the one that the average molar absorption coefficient increasing rate in the wavelength range of 200 nm to 380 nm of the dispersion solution obtained by dispersing the silicon compound-coated silicon-doped zinc oxide particle in the dispersion medium be controlled to be higher and 110% or more as compared to the zinc oxide particle without surface coating of the particle with a silicon compound and further without doping with silicon.

(Silicon Doping and Factors of Molar Absorption Coefficient Rise)

Although the factors for the increasing of the molar absorption coefficients of zinc oxide particle by the silicon doping of the present invention are not clear, the present applicant considers that where absorption of light by a substance is primarily assumed to be such that light beams (light energies) of specific wavelengths are absorbed based on electron transitions that are in accordance with energy levels inherent to a substance, the doping of silicon into the zinc oxide particle caused strain to be generated in crystal lattices, new bonds to be generated by random-zinc-oxygen-silicon-combinations, or oxygen defects, zinc or silicon defects, or the like to be generated and the consequential increase of light absorption ability (increase of the number of energy levels) due to forming of new energy levels similar but different to the energy levels that the zinc oxide particle has inherently and increase of light absorption ability (increase of light absorption efficiency of the material) due to enabling of entry of light, which could only be absorbed in a vicinity of the surface layers of the particle, into the inside of the particle is the factors for the rise of the molar absorption coefficients, that is, the increase of light absorption efficiency for the same light beam amount of the zinc oxide particle due to the doping of silicon.

(Specific Modes of the Average Reflectance)

FIG. 7 shows a graph of reflectance in a wavelength range of 200 nm to 2500 nm of the silicon compound-coated silicon-doped zinc oxide particles respectively obtained in Example 1-1 mentioned above and in Example 1-2 to Example 1-4 in which the silicon compound-coated silicon-doped zinc oxide particles were prepared with the molar ratio (Si/Zn) of silicon (Si) to zinc (Zn) contained in the particles being changed, and the zinc oxide particles obtained in Comparative Example 1 without surface coating of the particle with a silicon compound and further without doping with silicon. As mentioned above, the molar ratio (Si/Zn) is in the order of the molar ratio of Example 1-1<Example 1-2<Example 1-3<Example 1-4. As can be seen in FIG. 7, differences in the average reflectance in the wavelength region 780 nm to 2500 nm were seen due to the changing of the molar ratio (Si/Zn). It can be seen that whereas in a range of small molar ratio (Si/Zn) (Example 1-1 and Example 1-2), the average reflectance in the wavelength region of 780 nm to 2500 nm is made high compared to that of the zinc oxide particle without surface coating of the particle with a silicon compound and further without doping with silicon, by control being performed such that the molar ratio (Si/Zn) becomes large, the average reflectance in the wavelength region of 780 nm to 2500 nm is controlled to be low (to decrease) and is made lower than that of the zinc oxide particles obtained in Comparative Example 1 in Example 1-3 and Example 1-4. That is, the silicon compound-coated silicon-doped zinc oxide particle of the present invention is preferably controlled to be made high (to be increased) in the average reflectance in the near-infrared wavelength region of 780 nm to 2500 nm by the molar ratio (Si/Zn) being controlled to be low (to decrease).

(Average Molar Absorption Coefficient and Average Reflectance Applications and Usages of Particle Differing in Properties)

With the present invention, accurate transparent material design is made possible through separate use or mixed use of silicon compound-coated silicon-doped zinc oxide particle of different molar ratios (Si/Zn) according to the purpose of the transparent material. For example, in cases where, as with a glass or a clear coating film for a general architectural structure or a vehicle, ultraviolet rays in the wavelength region of 200 nm to 380 nm are to be absorbed with high efficiency and near-infrared rays in the wavelength region of 780 nm to 2500 nm are also to be reflected with high efficiency, it is suitable to adjust the molar ratio (Si/Zn) of silicon compound-coated silicon-doped zinc oxide particles and use, for example, silicon compound-coated silicon-doped zinc oxide particle such as those of Example 1-1 and Example 1-2 mentioned above, and in such cases where, as with a heated swimming pool, an indoor spa, agricultural film, or the like, ultraviolet rays are to be shielded effectively while on the other hand reflectance in regard to near-infrared rays may be low because heat retention of indoor heating is the main purpose, it is suitable to use silicon compound-coated silicon-doped zinc oxide particle such as those of Example 1-3 and Example 1-4 mentioned above. Also, more precise and accurate design of a glass composition is made possible by mixing the abovementioned silicon compound-coated silicon-doped zinc oxide particle of different molar ratios (Si/Zn) and formulating in a glass, an intermediate film, a paint for coating onto a glass, a clear coating film, a paint for forming a clear coating film, or the like. Also, a composition for transparent material arranged to contain a plurality of types of silicon compound-coated silicon-doped zinc oxide particle that is controlled in the above properties is, in the case of use in a transparent material, suitable as an ultraviolet shielding agent and/or near-infrared shielding agent with which use is made of the ultraviolet absorption ability and/or the near-infrared reflection ability upon securing transparency.

(Embodiment of Silicon Compound-Coated Silicon-Doped Zinc Oxide Particle—3)

The silicon compound-coated silicon-doped zinc oxide particle is the ultraviolet and/or near-infrared shielding agent composition for transparent material relating to the present invention whose particle is obtained by the method such as reaction, crystallization, separation, co-precipitation, or the like. The amount of hydroxyl group in the silicon compound-coated silicon-doped zinc oxide particle is preferably controlled, and the amount of the hydroxyl group is preferably the ratio of bonding of a single or other plural element (M) other than oxygen or hydrogen contained in the silicon compound-coated silicon-doped zinc oxide particle and the hydroxyl group (OH) or the ratio of bonding of silicon (Si) contained in the silicon compound and the hydroxyl group (OH). With regard to the above-mentioned single element or plurality of elements (M) other than oxygen or hydrogen, metal elements or semi-metal elements in the chemical periodic table are preferable. With regard to the semi-metal element in the present invention, semi-metal elements such as Si, Ge, As, Sb, Te, and Se may be cited as preferable examples, though not limited to them. However, with the silicon compound-coated silicon-doped zinc oxide particle in the present invention, Zn and Si are included in the one or plurality of different elements (M) other than oxygen or hydrogen. The silicon compound-coated silicon-doped zinc oxide particle may be those with which combined oxide particle, containing one element or a plurality of elements of the metals and metalloids other than Zn and Si, or combined oxide particle, containing metal and metalloid element, are coated with a silicon compound.

(Explanation of the M-OH Bond—1)

In FIG. 10, the FT-IR measurement results of the silicon compound-coated silicon-doped zinc oxide particles obtained in Example 1-1 and Example 4-4, measured with a total reflection method (ATR method) (hereinafter, this is simply abbreviated as IR measurement), are shown. Meanwhile, IR is the abbreviation of the infrared absorption spectrometry. As compared with the IR measurement result of the silicon compound-coated silicon-doped zinc oxide particle obtained in Example 1-1, the IR measurement result of the silicon compound-coated silicon-doped zinc oxide particle obtained in Example 4-4 shows smaller broad peaks about 1650 cm$^{-1}$ and about 3400 cm$^{-1}$, and it appears that the broad peaks between about 800 cm$^{-1}$ and 1250 cm$^{-1}$ shift to a higher wavelength side. In the present invention, among these peaks, it is presumed that the peak about 3400 cm$^{-1}$ is the peak derived from a hydroxide group (—OH) including water, the peaks between about 800 cm$^{-1}$ and about 1250 cm$^{-1}$ include the peaks derived from the M-OH bond. In the present invention, various color characteristics are controlled by controlling the M-OH bond ratio included in the silicon compound-coated silicon-doped zinc oxide particle, wherein the M-OH bond ratio can be determined, for example, by the IR measurement result. The M-OH bond ratio may be measured with the methods other than the IR measurement as well, wherein illustrative example thereof includes an X-ray photoelectron spectroscopic method (XPS), a solid nuclear magnetic resonance method (solid NMR), and an electron energy loss spectroscopic method (EELS).

(Explanation of M-OH Bond—2)

The results of wave shape separation of peaks with wavenumber of 100 cm$^{-1}$ to 1250 cm$^{-1}$ in the IR measurement results are shown in FIG. 11 for Example 1-1. Although in the above description, the vertical axis of the graph for IR measurement results represents transmittance (% T), the wave shape separation was performed with the vertical axis representing absorbance and therefore in FIG. 11, the vertical axis represents absorbance. With the present invention, it is deemed that, as results of waveform separation of peaks at wavenumbers of 100 cm$^{-1}$ to 1250 cm$^{-1}$ in the IR measurement results, peaks wave shape-separated in the wavenumber of 800 cm$^{-1}$ to 1250 cm$^{-1}$ are peaks derived from M-OH bond and peaks wave shape-separated in the wavenumber of 100 cm$^{-1}$ to 800 cm$^{-1}$ are peaks derived from M-O bond, and it is preferable for the silicon compound-coated silicon-doped zinc oxide particle to be controlled in the molar absorption coefficients in the ultraviolet region and/or the reflectance in the near-infrared region by controlling an area ratio of the peaks wave shape-separated for the M-OH bond to a total area of the respective peaks wave shape-separated in the wavenumber region of 100 cm$^{-1}$ to 1250 cm$^{-1}$. In other words, for example, in the IR measurement results for Example 1-1 shown in FIG. 11, two peaks wave shape-separated at the wavenumber of 100 cm$^{-1}$ to 800 cm$^{-1}$ are deemed to be peaks derived from M-O bond, two peaks wave shape-separated at the wavenumber of 800 cm$^{-1}$ to 1250 cm$^{-1}$ are deemed to be from M-OH bond, and the ratio of the M-OH bond contained in the silicon compound-coated silicon-doped zinc oxide particle is derived by calculating a ratio of a total area of the respective peaks wave shape-separated for the M-OH bond to the total area of the respective peaks waveform-separated in the wavenumber region of 100 cm$^{-1}$ to 1250 cm$^{-1}$. As one example of calculation of the ratio of the M-OH bond in the present invention, an area ratio (M-OH ratio [%]), calculated by wave shape-separating the peaks at wavenumbers of 100 cm$^{-1}$ to 1250 cm$^{-1}$ in the IR measurement results and totaling the areas of the M-OH bond peaks wave shape-separated at the wavenumber of 800 cm$^{-1}$ to 1250 cm$^{-1}$ to the total area of all wave shape-separated peaks, is indicated as the ratio of the M-OH bond.

(Explanation of M-OH Bond—3)

Here, the oxide particles of Example 1-1 and Example 4-4 are, as described above, the silicon compound-coated silicon-doped zinc oxide particle in which the at least part of the surface of the silicon-doped zinc oxide particle is coated with a silicon oxide, therefore the M in the M-OH bond can be specified as zinc (Zn) or silicon (Si). Also, similarly to the M-OH bond, the M-O bond can be specified as a Zn—O bond or a Si—O bond. It was also found that, in the present invention, the color characteristics that are the molar absorption coefficient in the ultraviolet region and/or the reflectance in the near-infrared region of the silicon compound-coated silicon-doped zinc oxide particle can be controlled by controlling the area ratio (M-OH ratio [%]) calculated from the total area of the M-OH bond to the total area of the all peaks which are separated into the wave shapes is taken as the peaks derived from N—OH bond which is separated into the wave shape in the wave number of 800 cm$^{-1}$ to 1250 cm$^{-1}$ by separating the peaks with the wave number of 100 cm$^{-1}$ to 1250 cm$^{-1}$ into the wave shape. However, in the present invention, among peaks which are separated into the wave shape with wavenumber of 800 cm$^{-1}$ to 1250 cm$^{-1}$, when the peaks can be assigned to different peaks from the M-OH bonds, such peaks can be assigned to bond different from M-OH bond. For instance, among the peaks wave shape-separated in the wavenumber of 800 cm$^{-1}$ to 1250 cm$^{-1}$ and specified as peaks of the M-OH bond in Example 1-1, the peak wave shape-separated in the vicinity of 992 cm$^{-1}$ can also be specified as being a peak related to the skeletal structure of silica and thus to be that of an M-O bond (Si—O bond) instead of an M-OH bond (Si—OH bond). The results of wave shape separation of peaks with the wavenumber of 800 cm$^{-1}$ to 1250 cm$^{-1}$ in the IR measurement results are shown in FIG. 12 for Example 1-1 that was shown in FIG. 5. As can be seen in FIG. 12, the peak in the vicinity of 922 cm$^{-1}$ can be assigned to a stretching vibration of ≡Si—O—Si≡, and can thus be deemed to be that of an Si—O bond, and the peak in the vicinity of 913 cm$^{-1}$ can be attributed to an Si—OH bond. By further subdividing peaks wave shape-separated with wavenumber of 800 cm$^{-1}$ to 1250 cm$^{-1}$ into that of the Si—OH bond and that of the Si—O bond in this manner to derive the ratio of the M-OH bond, the ratio of the M-OH bond may be controlled in more detail to control the color characteristics of the silicon compound-coated silicon-doped zinc oxide particle, or the color characteristics may be controlled by deriving the ratio of the Si—OH bond by wave shape-separating only the peaks at wavenumbers of 800 cm$^{-1}$ to 1250 cm$^{-1}$ and controlling the ratio of the Si—OH bond.

(Embodiment of Silicon compound-coated silicon-doped zinc oxide particle—4: XRD Measurement Results—2)

As can be seen in FIG. 5, in the XRD measurement results for the silicon compound-coated silicon-doped zinc oxide particle obtained in Example 1-1, although the peaks are broad as compared to those of zinc oxide not being doped with silicon (Comparative Example 1), peaks other than peaks derived from ZnO cannot be seen. In the XRD measurement results in Example 4-4 mentioned above, Peaks other than peaks derived from ZnO also cannot be seen (not shown), and despite this, in the IR measurement results, the peaks derived from the M-OH bond and Si—OH bond are detected, it is considered that the M-OH bond and the Si—OH bond are present mainly on the surface of the oxide particle rather than in the inside of the particle and peaks of hydroxide or the like were thus not detected in the XRD measurement results. Also from the XRD measurement results, it is indicated that the silicon compound confirmed by the IR measurement contains amorphous matter. Hereinafter, the M-OH bond and the Si—OH bond may be referred to collectively as M-OH bond.

(Control of Various Ratios and Control of Color Characteristics)

In the present invention, by controlling the M-OH bond ratio or the Si—OH bond ratio contained in the silicon compound-coated silicon-doped zinc oxide particles, color characteristics, such as reflectance and the average reflectance to light beams with the abovementioned wavelengths of 780 nm to 2500 nm in the near-infrared region, molar absorption coefficient, the average molar absorption coefficient or transmittance to light beams with the wavelength of 200 nm to 380 nm in the ultraviolet region or reflectance, the average reflectance, or transmittance to light beams with the wavelength of 380 nm to 780 nm in the visible region can be controlled accurately and precisely, and silicon compound-coated silicon-doped zinc oxide particle especially suitable for use in a composition for transparent material can thus be provided.

(Preferable Embodiment of Silicon Compound-Coated Silicon-Doped Zinc Oxide Particles—1)

In the present invention, the primary particle diameter of the silicon-doped zinc oxide particle in the silicon compound-coated silicon-doped zinc oxide particle is preferably 1 nm or more and 100 nm or less, and more preferably 1 nm or more and 50 nm or less. As described above, the molar absorption coefficient, the average reflectance, and the like of the silicon compound-coated silicon-doped zinc oxide particle can be controlled due to the zinc and silicon contained in the silicon compound-coated silicon-doped zinc oxide particle constituting an oxide in a composite manner, and it can be assumed that the influences that the particle surfaces impart on such properties are great and so forth, as described above, it can be assumed that the M-O bond ratio contained in the silicon compound-coated silicon-doped zinc oxide particle is existed mainly on the particle surface, therefore, the silicon compound-coated silicon-doped zinc oxide particle having a primary particle diameter of 100 nm or less is increased the surface area as compared with silicon compound-coated silicon-doped zinc oxide particle having a primary particle diameter of more than 100 nm, it is considered that influences are imparted on properties such as the average molar absorption coefficient and the average reflectance due to the control of the ratio (molar ratio) of silicon (Si) to zinc (Zn) in the silicon compound-coated silicon-doped zinc oxide particle and the control of the M-OH bond ratio in the silicon compound-coated silicon-doped zinc oxide particle. Silicon compound-coated silicon-doped zinc oxide particle having a primary particle diameter of 100 nm or less thus provide an advantage of enabling predetermined properties (especially properties suitable for a composition for transparent material) to be exhibited suitably by control of the molar ratio (Si/Zn) or the M-OH bond ratio of the silicon compound-coated silicon-doped zinc oxide particle.

(Preferable Embodiment of Silicon Compound-Coated Silicon-Doped Zinc Oxide Particle—2)

In the present invention, in the silicon compound-coated silicon-doped zinc oxide particle in which at least part of the surface of the particle is coated, a ratio of the average primary particle diameter of the silicon compound-coated silicon-doped zinc oxide particle after being coated with the compound to the average primary particle diameter of the silicon-doped zinc oxide particle before being coated is preferably 100.5% or more and 190% or less. When the coating of the compound to the silicon-doped zinc oxide particle is too thin, there is a risk that the effect to the characteristics due to the silicon-doped zinc oxide particle coated with the compound is difficult to be expressed; and thus, the average primary particle diameter of the silicon compound-coated silicon-doped zinc oxide particle after being coated with the compound is preferably 100.5% or more of the average primary particle of the silicon-doped zinc oxide particle. On the other hand, when the coatis too thick, or when a coarse agglomerate is coated, control of the properties is so difficult that the average primary particle diameter of the silicon compound-coated silicon-doped zinc oxide particle after being coated with the compound is preferably 190% or less of the average primary particle diameter of the silicon-doped zinc oxide particle. The silicon-doped zinc oxide particle coated with the silicon compound relating to the present invention may be a core-shell type silicon compound-coated silicon-doped zinc oxide particle in which entire surface of the core silicon-doped zinc oxide particle is uniformly coated with the silicon compound. The compound-coated silicon-doped zinc oxide particle is preferably the one which is coated at least part of the surface of a single particle thereof, not an agglomerate of plural oxide particles; however, it may be a silicon compound-coated silicon-doped zinc oxide particle in which at least part of the surface of the agglomerate body of plural silicon-doped zinc oxide particle is coated.

(Preferable Embodiment of Silicon Compound-Coated Silicon-Doped Zinc Oxide Particle—3)

The silicon compound which coats at least part of the surface of the silicon-doped zinc oxide particle in the present invention is preferably a silicon compound, wherein a compound including a silicon oxide is still more preferable, while a compound including an amorphous silicon oxide is more preferable. When the silicon compound includes an amorphous silicon oxide, the silicon compound-coated silicon-doped zinc oxide particle can be strictly controlled in its color characteristics such as reflectance, transmittance, molar absorption coefficient, hue, and saturation. When the silicon compound is an amorphous silicon oxide, a lot of M-OH (Si—OH) bond exist; and thus, there is a merit that control of the particle properties of the present invention can be easy.

(Method for Producing Silicon Compound-Coated Silicon-Doped Zinc Oxide Particles: Preferable Method—1)

As one example of the production method of the silicon compound-coated silicon-doped zinc oxide particle relating to the present invention, it is preferable to use the production method of the silicon compound-coated silicon-doped zinc oxide particle wherein an silicon-doped zinc oxide raw material solution including at least a raw material of silicon-doped zinc oxide particle and an oxide separating solvent including at least an silicon-doped zinc oxide separating substance to separate the silicon-doped zinc oxide particle are prepared, whereby the silicon-doped zinc oxide particle is separated by the method such as reaction, precipitation, separation, co-deposition, or the like in a mixed fluid formed by mixing the silicon-doped zinc oxide raw material solution with the oxide separating solvent, and the mixed fluid including separated the silicon-doped zinc oxide particle is mixed with silicon compound raw material solution including at least silicon compound raw material, thus at least part of the surface of the silicon-doped zinc oxide particle is coated with silicon compound. Meanwhile, the zinc and the silicon included in the silicon-doped zinc oxide particle may be included together in the silicon-doped zinc oxide raw material solution or may be included respectively in the silicon-doped zinc oxide raw material solution and the oxide separating solvent, or may be included in both the silicon-doped zinc oxide raw material solution and the oxide separating solvent.

The raw material of the silicon compound-coated silicon-doped zinc oxide particle in the present invention is not particularly restricted. Any material which can produce the silicon compound-coated silicon-doped zinc oxide particle by the method such as reaction, precipitation, separation, co-deposition, or the like may be used. In the present invention, compounds of a metal or of a semi-metal those containing zinc are collectively called the compound. The compound is not particularly restricted, whereas illustrative example thereof includes a metal or a semi-metal in the form of its salt, oxide, hydroxide, hydroxylated oxide, nitride, carbide, complex, organic salt, organic complex, organic compound, as well as hydrate or organic solvate of them. The metal salt or the semi-metal salt is not particularly restricted, whereas illustrative example thereof includes a metal or a semi-metal in the form of nitrate salts, nitrous salts, sulfate salts, sulfite salts, formate salts, acetate salts, phosphate salts, phosphite salts, hypophosphite salts, chlorides, oxy salts, acetylacetonato salts, as well as hydrates or organic solvates of them. Illustrative example of the organic compound includes alkoxides of a metal or of a semi-metal. These metal compounds and semi-metal compounds may be used singly or as a mixture of two or more of them.

In addition, with regard to the raw material of the silicon compound in the case of the silicon compound-coated silicon-doped zinc oxide particle including the silicon compound, such as in the case that the oxide particle is the silicon compound-coated oxide, illustrative example thereof includes oxides, hydroxides, salts, alkoxides, or the like of silicon, as well as hydrates of them. Although there is no particular restriction, the following substances may be cited: silicate salts such as sodium silicate, phenyl trimethoxy silane, methyl trimethoxy silane, methyl triethoxy silane, 3-glycidoxypropyl trimethoxy silane, 3-trifluoropropyl-trimethoxy silane, methacryloxypropyl triethoxy silane, tetramethoxy silane (TMOS), tetraethoxy silane (TEOS), oligomer condensate of TEOS such as ethyl silicate 40, tetraisopropylsilane, tetrapropoxysilane, tetraisobutoxysilane, tetrabutoxysilane, and the like. In addition, as the raw material for the silicon compound, other siloxane compounds, bis(triethoxysilyl) methane, 1,9-bis(triethoxysilyl) nonane, diethoxy dichlorosilane, triethoxy chlorosilane, etc., may also be used. These raw materials may be used as the raw material of the silicon-doped zinc oxide particle and may also be used as the raw material of the silicon compound to coat the silicon-doped zinc oxide particle. In the case where the oxide particle in the present invention is the silicon compound-coated silicon-doped zinc oxide particle, it is preferable that a molar ratio of silicon (Si) to the metal element (M) including zinc that constitutes the silicon-doped zinc oxide particle to be coated be 0.01 or more and 1.00 or less.

In the case where the raw material of the zinc oxide particle or of the silicon compound is solid, it is preferable to use respective raw material in the molten state or in the state of being mixed with or dissolved into a later-described solvent (including the state of molecular dispersion thereof). Even in the case where the oxide particle raw material is a liquid or a gas, it is preferable to use the respective raw material in the state of being mixed with or dissolved into a later-described solvent (including the state of molecular dispersion thereof).

There is no particular restriction in the silicon-doped zinc oxide separating substance so far as it can separate the silicon-doped zinc oxide particle raw material included in the silicon-doped zinc oxide material solution as the silicon-doped zinc oxide particle, wherein for example, an acidic substance or a basic substance may be used. It is preferable to use the silicon-doped zinc oxide separating substance at least in the state of being mixed with, dissolved into, or molecular-dispersed in a later-described solvent.

Illustrative example of the basic substance includes: metal hydroxides such as sodium hydroxide and potassium hydroxide; metal alkoxides such as sodium methoxide and sodium isopropoxide; amine compounds such as triethylamine, diethylamino ethanol, and diethylamine; and ammonia.

Illustrative example of the acidic substance includes: inorganic acids such as aqua regia, hydrochloric acid, nitric acid, fuming nitric acid, sulfuric acid, and fuming sulfuric acid; and organic acids such as formic acid, acetic acid, chloroacetic acid, dichloroacetic acid, oxalic acid, trifluoroacetic acid, trichloroacetic acid, and citric acid. Meanwhile, the basic substance and the acidic substance may be used not only in order to separate the silicon compound-coated silicon-doped zinc oxide particle but also as the pH adjusting agent in order to control the ratio of the M-OH bond included in the silicon compound-coated silicon-doped zinc oxide particle as described before.

(Solvent)

With regard to the solvent to be used in the silicon-doped zinc oxide raw material solution and the oxide separating solvent, for example, water, an organic solvent, or a mixed solvent comprising plurality of them may be cited. Illustrative example of the water includes tapped water, ion-exchanged water, pure water, ultra-pure water, and RO water (reverse osmosis water). Illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogenated compound solvent, an ester compound solvent, an ionic liquid, a carboxylic acid compound, and a sulfonic acid compound. These solvents may be used singly or as a mixture of plurality of them. Illustrative example of the alcohol compound solvent includes: monoalcohols such as methanol and ethanol; and polyols such as ethylene glycol and propylene glycol.

(Dispersant, Etc.)

In the present invention, in accordance with the purpose and necessity, various dispersants and surfactants may be used so far as they do not exert an adverse effect in preparation of the silicon compound-coated silicon-doped zinc oxide particle. There is no particular restriction in them, whereas generally used various dispersants and surfactants which are commercially available goods, products, newly synthesized substances, or the like may be used. Illustrative example thereof includes an anionic surfactant, a cationic surfactant, a nonionic surfactant, and various polymer dispersants. These may be used singly or as a mixture of two or more of them. The surfactant and dispersant may be included in at least any one of the silicon-doped zinc oxide raw material solution and the oxide separating solvent. Alternatively, the surfactant and the dispersant may be included in a fluid other than the silicon-doped zinc oxide raw material solution and the oxide separating solvent.

(Method for Preparing Silicon Compound-Coated Silicon-Doped Zinc Oxide Particles: Outline of Method—1)

In the present invention, firstly, it is preferable, as described above, that at least the zinc and the silicon contained in the silicon-doped zinc oxide particle be present at least in the inside of the particle, and in producing the silicon-doped zinc oxide particle by precipitation or the like, it is preferable to prepare the silicon-doped zinc oxide particle by separating oxides of a plurality of different elements practically simultaneously. For example, in an exemplary case where a silicon-doped zinc oxide raw material solution, in which zinc nitrate hexahydrate, as a raw material of zinc oxide, and tetraethyl orthosilicate (TEOS) that is one type of silicon compound as a raw material of silicon for doping are dissolved in an acidic aqueous solution, and an oxide separating solvent, which is an aqueous solution of an alkali metal hydroxide (silicon-doped zinc oxide precipitate), such as sodium hydroxide, are mixed to precipitate silicon-doped zinc oxide particle, the silicon-doped zinc oxide particle must be separated by mixing the oxide separating solvent with a pH such as 14 or more in the silicon-doped zinc oxide raw material solution with a pH of 1 to around 2 or less than 1. Although an oxide containing silicon is separated readily in a pH range of 7 to 12 and zinc oxide is readily separated, for example, in a pH range of 9 or more in an alcohol solvent, such as ethylene glycol, when, for example, an oxide separating solvent that is basic gradually dripped into a silicon-doped zinc oxide solution that is acidic, the pH of the mixed solution of the silicon-doped zinc oxide solution and the oxide separating solvent also changes gradually from acidic to basic, and it is therefore considered that, for example, a silicon oxide which is one example of a silicon compound is separated (begins to precipitate) when the pH becomes close to 7 and zinc oxide is separated thereafter when the pH becomes close to 9, that is, zinc oxide particle and silicon oxide particle are separated in stepwise manner, and in this case, it is difficult to prepare silicon-doped zinc oxide particle in which zinc and silicon are contained in the inside of the particle. By instantaneously adjusting the pH of the abovementioned mixed solution to that at which both the zinc oxide and the silicon oxide are separated, apparently simultaneous separation can be made to occur and it therefore becomes possible to arrange the separation for preparing the silicon-doped zinc oxide particle in which both silicon and zinc are contained at least in the inside of the particle.

(Method for Preparing Silicon Compound-Coated Silicon-Doped Zinc Oxide Particles: Outline of Method—2)

Further, in the case where the at least part of the surface of the silicon-doped zinc oxide particle is coated with silicon compound, it is preferable that the silicon-doped zinc oxide particle be coated before aggregation the degree in which the silicon-doped zinc oxide particle cannot exhibit properties of the present invention. Upon mixing the silicon compound raw material solution with the fluid containing the silicon-doped zinc oxide particle, it is important to discharge the silicon compound on the surface of the silicon-doped zinc oxide particle by introducing the silicon compound raw material solution at faster speed than agglomeration after the silicon-doped zinc oxide particle is separated. Further, by charging the silicon compound raw material solution into the fluid containing the silicon-doped zinc oxide particle, the pH of the fluid containing the silicon-doped zinc oxide particle and the concentration of the silicon compound raw material are gradually changed, and when the silicon compound to coat the surface of the particle is separated after the particle becomes in the condition under readily aggregation being occurred from readily being dispersed, it becomes difficult to achieve coating before aggregation occurs to a degree such that the properties of the present invention cannot be exhibited. It is preferable that the silicon compound raw material contained in the silicon compound raw material solution make act immediately after the silicon-doped zinc oxide particle is separated.

(Method for Producing Silicon-Doped Metal Oxide Particle: Apparatus)

As one example of the production method of the silicon compound-coated silicon-doped zinc oxide particle relating to the present invention, a method may be cited in which the silicon compound-coated silicon-doped zinc oxide particle is prepared, for example, by using a micro reactor, or by carrying out a reaction in a dilute system in a batch reactor. Alternatively, the equipment and method proposed by the applicant of the present invention, described in Japanese Patent Laid-Open Publication No. 2009-112892, may be used to prepare the silicon compound-coated silicon-doped zinc oxide particle. The equipment described in Japanese Patent Laid-Open Publication No. 2009-112892 has a stirring vessel having an inner circumferential surface whose cross sectional shape is circular as well as a stirring tool arranged so as to form a minute clearance with the inner circumferential surface of the stirring vessel, wherein the stirring vessel is provided with at least two fluid inlet ports and at least one fluid outlet port; of the fluids to be processed, one fluid to be processed which includes one of reactants is introduced into the stirring vessel form one of the fluid inlet ports, and a second fluid to be processed which includes one reactant that is different from the aforementioned reactant is introduced from one fluid inlet port other than the aforementioned fluid inlet port into the stirring vessel from a flow path that is different from that of the first fluid to be processed; and at least one of the stirring vessel and the stirring tool rotates relative to the other at high speed so as to cause a thin film state of the fluids to be processed; and in this thin film, the reactants included at least in the first fluid to be processed and the second fluid to be processed are caused to react to each other. As shown in FIG. 4 and FIG. 5 of the said gazette, it is described that three or more introduction ports may be arranged in order to introduce three or more fluids to be processed into the stirring vessel. In addition, as one example of the micro reactor, the equipment based on the same principle as the fluid processing equipment described in Patent Documents 6 and 7 may be cited. Other than that, the silicon-doped zinc oxide particle may be prepared by a crushing method using a bead mill or the like, wherein after the preparation, the silicon-doped zinc oxide particle subjects to process of coating with silicon compound in the reactor or by the microreactor.

(Control of Ratio of M-OH Bonds: Description of Method—1)

In the present invention, the method for controlling the ratio of the M-OH bond is not particularly restricted, however, it is preferable to control the ratio of the M-OH bond by a changing treatment of functional group contained in the silicon compound-coated silicon-doped zinc oxide particle. The changing treatment of the functional group may be carried out by to the functional group included in the silicon compound-coated silicon-doped zinc oxide particle such as a substitution reaction, an addition reaction, an elimination reaction, a dehydration reaction, a condensation reaction with these methods, the M-OH bond ratio can be controlled. In control of the M-OH bond ratio, the M-OH bond/M-O bond ratio may be increased or decreased. In the present invention, it is preferable that esterification of the M-OH bond be achieved by the above control. As one example thereof, the esterification is achieved by dehydration reaction/condensation reaction in which OH is removed from a carboxyl group (—COOH) and H is removed from a hydroxyl group (—OH). Other than the above, the M-OH bond ratio can also be controlled by the method for making hydrogen peroxide or ozone act to the silicon compound-coated silicon-doped zinc oxide particle. Further, the M-OH bond ratio can be controlled by the prescription of separating the silicon compound-coated silicon-doped zinc oxide particle or the method for controlling the pH or the like during separating the silicon compound-coated silicon-doped zinc oxide particle in the solution. In addition, the ratio may be controlled by the method in which the silicon compound-coated silicon-doped zinc oxide particle is subjected to a heat treatment as one example of the dehydration reaction. In the case where the M-OH bond ratio is controlled by a heat treatment of the silicon compound-coated silicon-doped zinc oxide particle, the heat treatment may also be carried out with a dry process or under the state of the dispersion body in which the silicon compound-coated silicon-doped zinc oxide particle is dispersed in a dispersing medium. In addition, as it will be described later, the ratio may be controlled by dispersing the silicon compound-coated silicon-doped zinc oxide particle in a target solvent followed by the treatment such as stirring the solution after the substance including a functional group is added into the dispersion solution; or alternatively, the ratio may be controlled by a treatment such as stirring the dispersion solution including the separated silicon compound-coated silicon-doped zinc oxide particles. In addition, in the method in which impurities are removed from a slurry solution including the silicon compound-coated silicon-doped zinc oxide particle by a membrane filtration with a cross flow method together with a dispersion processing of the particle in an apparatus having a dispersing equipment and a filtration membrane continuously constructed, these ratio can be controlled, among others, by changing the slurry temperature or the temperature of the washing solution used in the cross flow. In this case, uniform reformation treatment can be done to the primary particle of the silicon compound-coated silicon-doped zinc oxide particle, especially to the surface of each primary particle, so that there are merits that control of the ratio of the M-OH bond included in the oxide particle of the present invention as well as control of the characteristics can be carried out more strictly and uniformly.

The pH control upon separating the silicon compound-coated silicon-doped zinc oxide particle may be carried out by including a pH controlling agent such as an acidic substance or a basic substance into at least one of various solutions and solvents in the present invention, or by changing the flow rate upon mixing a fluid containing an silicon-doped zinc oxide raw material solution with a fluid containing an zinc oxide separating solvent.

The method to change the functional group included in the silicon compound-coated silicon-doped zinc oxide particle relating to the present invention is not particularly restricted. A method may be carried out in which the silicon compound-coated silicon-doped zinc oxide particle is dispersed into a target solvent followed by adding a substance having a functional group into the dispersion solution thus obtained and then subjecting the dispersion solution to the treatment such as stirring. Alternatively, a method may be carried out in which a fluid including the silicon compound-coated silicon-doped zinc oxide particle is mixed with a fluid including a substance having a functional group by using the afore-mentioned micro reactor.

The substance having a functional group is not particularly restricted. Substances having a functional group which can be substituted with a hydroxy group included in the silicon compound-coated silicon-doped zinc oxide particle may be cited, wherein illustrative example thereof includes acylating agents such as acetic anhydride and propionic anhydride; methylating agents such dimethyl sulfate and dimethyl carbonate; and silane coupling agents such as chloro trimethyl silane and methyl trimethoxy silane.

As described before, the M-OH bond ratio can also be controlled by the method in which hydrogen peroxide or ozone is caused to act to the silicon compound-coated silicon-doped zinc oxide particle. The method in which hydrogen peroxide or ozone is caused to act to the silicon compound-coated silicon-doped zinc oxide particle is not particularly restricted. A method may be carried out in which the silicon compound-coated silicon-doped zinc oxide particle is dispersed into a target solvent followed by adding solution such as hydrogen peroxide or ozone, an aqueous solution including them, or the like into the dispersion solution thereby subjecting the treatment such as stirring. Alternatively, a method may be carried out in which a fluid including the silicon compound-coated silicon-doped zinc oxide particle is mixed with a fluid including hydrogen peroxide or ozone by using the afore-mentioned micro reactor.

With regard to the dispersion body, a liquid dispersion body may be used in which the silicon compound-coated silicon-doped zinc oxide particle is dispersed in a liquid dispersion medium such as water, an organic solvent, or a resin. Alternatively, a film-like dispersion body to coat onto a glass or a coating body which is prepared by using a dispersion solution which includes the silicon compound-coated silicon-doped zinc oxide particles may be used. In the case when the heat treatment is carried out under the state of the dispersion body which includes the silicon compound-coated silicon-doped zinc oxide particles, agglomeration of the particles can be suppressed more readily as compared with the heat treatment in a dry method the characteristics of the silicon compound-coated silicon-doped zinc oxide particle can be controlled by controlling the M-OH bond included in the silicon compound-coated silicon-doped zinc oxide particle with the method such as the heat treatment; and thus, these methods are suitable in reduction of the number of process steps as well as in strict control of the characteristics. Especially, in a coat film such as a clear coat film which includes a substance such as an he silicon compound-coated silicon-doped zinc oxide particle having characteristics of a UV-beam shielding effect and reflection of a near infrared beam, when a molar absorption coefficient in a UV region, i.e., a capacity of the he silicon compound-coated silicon-doped zinc oxide particle to absorb a UV beam, is higher, transparency of the coat film as the he silicon compound-coated silicon-doped zinc oxide particle dispersion body can be increased; and also, by reducing the use amount of the he silicon compound-coated silicon-doped zinc oxide particle, a Haze value can be made lower; thus this can be suitably used as a clear coating film for the purpose of ultraviolet and/or near-infrared shielding.

The use of film-like composition, for example, in a laminated glass in which an intermediate film such as a resin film is interposed between plural plate glasses, or as a film-like composition which is attached to a glass and the like of a building, by dispersing the silicon compound-coated silicon-doped zinc oxide particle in a glass, a resin, or the like, this can be suitably used for absorption of a UV beam, reflection of a near infrared beam. Moreover, because this can enhance the transparent characteristic to a visible light, this can also be suitably used as a composition for glass for the purpose of ultraviolet and/or near-infrared shielding. In addition, the characteristics of the silicon compound-coated silicon-doped zinc oxide particle can also be controlled by controlling the M-OH bond ratio included in the silicon compound-coated silicon-doped zinc oxide particle by changing a functional group with a heat treatment or the like after the silicon compound-coated silicon-doped zinc oxide particle is made to a film-like form by dispersing the silicon compound-coated silicon-doped zinc oxide particle to a glass, a resin, or the like; and thus, this is suitable in reduction of the number of process steps as well as in strict control of the characteristics.

(Control of the M-OH Bond Ratio: Outline of the Method)

The present invention controls, as described above, the ratio of the M-OH bond which is the bond between the hydroxide group (OH) and a single element or plural elements (M) other than oxygen or hydrogen included in the silicon compound-coated silicon-doped zinc oxide particle. Specifically, this method may be carried out by dividing the process into a step in which an untreated silicon compound-coated silicon-doped zinc oxide having a prescribed primary particle diameter whose M-OH bond ratio is to be controlled is prepared and a step in which control of the M-OH bond ratio is carried out to the untreated silicon compound-coated silicon-doped zinc oxide. However, in the step in which the untreated he silicon compound-coated silicon-doped zinc oxide particle is prepared, upon producing the he silicon compound-coated silicon-doped zinc oxide particle by separation or the like, it doesn't matter if the particle having the M-OH bond ratio controlled to a prescribed value is produced.

(Composition for Transparent Material—1)

The composition for transparent material of the present invention is not particularly restricted. Depending on the purpose, if needed, the composition for transparent material may arbitrarily contain further, besides a pigment and a dye, additives such as a wetting agent, a dispersant, a color separation inhibitor, a levelling agent, a viscosity controlling agent, an anti-skinning agent, an anti-gelling agent, an anti-foaming agent, an anti-sagging agent, a fungicide, a UV absorber, a near-infrared reflection agent, a film-forming aid, a surfactant, a resin component, and the like. Illustrative example of the resin component for purpose of intermediate film or film like for adhesion of glasses to each other includes a polyester resin, a melamine resin, a phenol resin, an epoxy resin, a vinyl chloride resin, an acryl resin, a urethane resin, a silicon resin, and a fluorinated resin.

When composition for glass of the present invention is coated onto a glass surface, the composition may be composed of plural compositions for glass or may be to include a coloring material or may be used in the paint such as a clear paint.

For the purpose of the film-like glass composition, a binder resin, a curing agent, a curing catalyst, a leveling agent, a surfactant, a silane coupling agent, an anti-foaming agent, a coloring material such as a pigment or a dye, an antioxidant, and the like, may be included as needed.

(Composition for Transparent Material—2)

The composition for transparent material relating to the present invention includes the oxide particle such as the silicon compound-coated silicon-doped zinc oxide particle powder, the dispersion body having the silicon compound-coated silicon-doped zinc oxide particles dispersed into a liquid dispersing medium, and a dispersion body having the silicon compound-coated silicon-doped zinc oxide particles dispersed to a solid (or a liquid, etc., before being solidified) such as a resin. The silicon compound-coated silicon-doped zinc oxide particle included in the composition for transparent material may be composed of one silicon compound-coated silicon-doped zinc oxide particle, or composed of the agglomerate having plural silicon compound-coated silicon-doped zinc oxide particles agglomerated, or a mixture of them. When they are composed of the agglomerate having plural silicon compound-coated silicon-doped zinc oxide particles agglomerated, the size of the agglomerate is preferably 100 nm or less. The composition for transparent material described above may be used with any of various coloring materials or may be a composition for overcoating a glass as a coating film. Moreover, when the composition for transparent material is a dispersion body, illustrative example of the liquid dispersion medium includes water such as tapped water, distilled water, RO water (reverse osmosis water), pure water, and ultra-pure water; alcoholic solvents such as methanol, ethanol, and isopropyl alcohol; polyalcoholic s solvents such as propylene glycol, ethylene glycol, diethylene glycol, and glycerin; ester solvents such as ethyl acetate and butyl acetate; aromatic solvents such as benzene, toluene, and xylene; ketonic solvents such as acetone and methyl ethyl ketone; nitrile solvents such as acetonitrile; and silicone oils, vegetable oil, and waxes. These may be used singly or as a mixture of plurality of them.

(Color of Composition for Transparent Material)

The color of glass used in the composition for transparent material of the present invention is not particularly limited. Also, the silicon compound-coated silicon-doped zinc oxide particle of the present invention is nearly colorless and transparent in the visible region, thus when the silicon compound-coated silicon-doped zinc oxide particle is coated as a topcoat for the glass or the coating body, there is a merit that affection to the original color of glass or coating body becomes lower. The composition for transparent material of the present invention may be contained any of various pigments and dyes in addition to the silicon compound-coated silicon-doped zinc oxide particle. Among them, illustrative example thereof includes: pigments and dyes that are classified to C. I. Pigment Green in the pigment that constitutes a green color; pigments and dyes that are classified to C. I. Pigment Blue in the pigment that constitutes a blue color; pigments and dyes that are classified to C. I. Pigment White in the pigment that constitutes a white color; pigments and dyes that are classified to C. I. Pigment Yellow in the pigment that constitutes a yellow color; pigments and dyes that are classified to C. I. Pigment Red in the pigment and dye that constitute a red color; and pigments and dyes that are classified to C. I. Pigment Violet and C. I. Pigment Orange in the pigment and dye that constitute a violet color. More specific example thereof includes quinacridone type pigments such as C. I. Pigment Red 122 and C. I. Pigment Violet 19; diketo pyrrole type pigments such as C. I. Pigment Red 254 and C. I. Pigment Orange 73; naphthol type pigments such as C. I. Pigment Red 150 and C. I. Pigment Red 170; perylene type pigments such as C. I. Pigment Red 123 and C. I. Pigment Red 179; and azo type pigments such as C. I. Pigment Red 144. These pigments and dyes may be used singly or as a mixture of plurality of them. Meanwhile, the composition for transparent material of the present invention may be blended singly to the transparent substrate such as composition for glass or clear coating film and the like without mixing with these pigments, dyes, or the like. By including the silicon compound-coated silicon-doped zinc oxide particle in the composition for transparent material, the ultraviolet absorption ability of a transparent substrate such as glasses used in buildings, vehicles, displays or the like can be enhanced furthermore; decomposition of an organic substance or the like in a building or in a vehicle can be suppressed, and temperature change in a building or a in a vehicle can be suppressed because a near infrared beam can be effectively reflected so as to be shielded, and improvement in transparency of a glass or the like can be contributed because of a high transmitting characteristic to a visible beam; and thus, this is suitable. Also, in the silicon compound-coated silicon-doped zinc oxide particle of the present invention, the silicon compound-coated silicon-doped zinc oxide particle is further doped with cobalt to exhibit the color from light blue to blue, by further doping with iron, the silicon compound-coated silicon-doped zinc oxide particle can exhibit the color from yellow to red, thus he silicon compound-coated silicon-doped zinc oxide particle per se can be colored

EXAMPLES

Hereinafter, the present invention will be explained in more detail with referring to Examples; however, the present invention is not limited only to these Examples. Meanwhile, pure water used in the following Examples is the pure water having a conductivity of 0.86 μS/cm (measurement temperature of 25° C.) unless specifically described.

(Preparation of the TEM Observation Sample and Preparation of STEM Observation Sample)

Part of the wet cake sample of the silicon compound-coated silicon-doped zinc oxide particle obtained in Example is dispersed into propylene glycol, and then further diluted with isopropyl alcohol (IPA) by 100 times. The diluted solution thus obtained was dropped onto a collodion film or a micro grid and then dried to obtain the TEM observation sample or the STEM observation sample.

(Transmission Electron Microscope and Energy Dispersive X-Ray Spectrometer Apparatuses: TEM-EDS Analysis)

For observation and quantitative analysis of the silicon compound-coated silicon-doped zinc oxide particle by the TEM-EDS analysis, a transmission electron microscope (JEM-2100; manufactured by JEOL Ltd.) equipped with an energy dispersive X-ray spectrometer (JED-2300; manufactured by JEOL Ltd.) was used. The observation conditions with 80 kV of the acceleration power and 25000 or more of the observation magnification were used. The particle diameter was calculated from the distance between the both edges of the maximum outer circumference of the silicon compound-coated silicon-doped zinc oxide particle observed with TEM, and an average value thereof (average primary particle diameter) was calculated from the measurement results of the particle diameters of 100 particles. The molar ratio of the element components that constitute the silicon compound-coated silicon-doped zinc oxide particle other than oxygen and hydrogen was calculated by TEM-EDS, and then, an average value of the calculation results of the molar ratios of 10 or more of the particles was calculated.

(Scanning Transmission Electron Microscope and Energy Dispersive X-Ray Analysis Apparatus: STEMEDS Analysis)

For mapping and quantitative analysis of the elements included in the silicon compound-coated silicon-doped zinc oxide particle by the STEM-EDS analysis, an atomic resolution analytical electron microscope (JEM-ARM200F; manufactured by JEOL Ltd.) equipped with an energy dispersive X-ray spectrometer (Centurio; manufactured by JEOL Ltd.) was used. Analysis was carried out using the observation conditions with 80 kV of the acceleration power, 50000 or more of the observation magnification, and 0.2 nm of the beam diameter.

(X-Ray Diffraction Measurement)

For the X-ray diffraction (XRD) measurement, a powder X-ray diffraction measurement apparatus (EMPYREAN: manufactured by PANalytical business unit of Spectris Co., Ltd.) was used. The measurement conditions with a measurement range of 10 to 100 [°2 Theta], a Cu anticathode, a tube voltage of 45 kV, a tube current of 40 mA, and a scanning rate of 0.3°/min were used. The XRD measurement was carried out using dried powders of the silicon compound-coated silicon-doped zinc oxide particles obtained in each Example.

(Ft-Ir Measurement)

For measurement of FT-IR, a Fourier transform infrared spectrophotometer (FT/IR-6600: manufactured by JASCO Corp.) was used. The measurement was made using the ATR method under a nitrogen atmosphere with the resolution of 4.0 cm$^{-1}$ and the cumulative number of 1024. Separation of the wave shapes of the peaks in the wave number range of 100 cm$^{-1}$ to 1250 cm$^{-1}$ of the infrared absorption spectrum and separation of the wave shapes of the peaks in the wave number range of 800 cm$^{-1}$ to 1250 cm$^{-1}$ of the infrared absorption spectrum were made with the curve fitting such that the residual sum of squares would become 0.01 or less by using a spectrum analysis program attached to a control software of the FT/IR-6600. The measurement was carried out using the dried powder of the silicon compound-coated silicon-doped zinc oxide particle obtained in Examples.

(Transmission Spectrum, Absorption Spectrum, Reflection Spectrum)

Transmission spectrum, absorption spectrum, and reflection spectrum were measured using a UV, visible, near infrared spectrophotometer (V-770: manufactured by JASCO Corp.). Measurement was carried out with a measurement range of 200 nm to 800 nm in the transmission spectrum; a measurement range of 200 nm to 800 nm in the absorption spectrum; the sampling rate of 0.2 nm; and the low measurement rate. Average transmittance was calculated by simple averaging of the transmittances of plural measurement wavelengths in a certain wavelength range.

With regard to the molar absorption coefficient, after measurement of the absorption spectrum, from the absorbance obtained from the measurement and the silicon compound-coated silicon-doped zinc oxide particle concentration of the dispersion solution thereof, the molar absorption coefficient at each measured wavelength was calculated; and then, the graph was obtained with the measured wavelength in the horizontal axis and the molar absorption coefficient in the vertical axis. For the measurement thereof, a cell for a liquid sample with a thickness of 1 cm was used. The average molar absorption coefficient was calculated by simple averaging of the molar absorption coefficients at plural measured wavelengths with the wavelength range of 200 nm to 380 nm.

With regard to the reflection spectrum, the total reflection measurement of specular reflection and diffusion reflection was carried out with the measurement range of 200 nm to 2500 nm, the sampling rate of 2.0 nm, the measurement rate of medium, and the method of a double beam measurement. In the background measurement (setting of the base line) upon measurement of the powder, a standard white plate (product name of Spectralon (trade mark): manufactured by Labspere, Inc.) was used. The reflection spectrum was measured by using the dried powder of the silicon compound-coated silicon-doped zinc oxide particle obtained in each Example. The average reflectance was obtained by simple averaging of the reflectances at plural measured wavelengths in the wavelength range of 780 nm to 2500 nm.

Example 1

As Example 1, the silicon compound-coated silicon-doped zinc oxide particle in which at least part of the surface of the silicon-doped zinc oxide particle is coated with a silicon compound is described. By using Clearmix (product name: CLM-2.2S, manufactured by M. Technique Co., Ltd.), which is a high speed rotational dispersion emulsifier, the silicon-doped zinc oxide raw material solution (A-solution), the oxide separating solvent (B-solution), and the silicon compound raw material solution (C-solution) each were prepared. Specifically, according to the prescription of the silicon-doped zinc oxide raw material solution described in Example 1 of Table 1, each component of the silicon-doped zinc oxide raw material solution were uniformly mixed by stirring for 30 minutes at the preparation temperature of 40° C. by using Clearmix with the rotation number of the rotor thereof being 20000 rpm to obtain the silicon-doped zinc oxide raw material solution. Also, according to the prescription of the oxide separating solvent described in Example 1 of Table 1, each component of the oxide separating solvent were uniformly mixed by stirring for 30 minutes at the preparation temperature of 45° C. by using Clearmix with the rotation number of the rotor thereof being 15000 rpm to obtain the oxide separating solvent. Further, according to the prescription of the silicon compound raw material solution described in Example 1 of Table 1, each component of the silicon compound raw material solution were uniformly mixed by stirring for 10 minutes at the preparation temperature of 20° C. by using Clearmix with the rotation number of the rotor thereof being 6000 rpm to obtain the silicon compound raw material solution.

Meanwhile, the substances used here and represented by chemical formula or abbreviation described in Table 1 are: $Zn(NO_3)_2 \cdot 6H_2O$ for zinc nitrate hexahydrate (manufactured by KANTO CHEMICAL CO., INC.), EG for ethylene glycol (manufactured by Kishida Chemical Co., Ltd.), 60 wt % $HNO_3$ for concentrated nitric acid (manufactured by Kishida Chemical Co., Ltd.), NaOH for sodium hydroxide (manufactured by KANTO CHEMICAL CO., INC.), TEOS for tetraethyl orthosilicate (manufactured by Wako Pure Chemical Industries, Ltd.), and MeOH for methanol (manufactured by Godo Co., Ltd.).

In Table 2, operation conditions of the fluid processing apparatus, the average primary particle diameter calculated from the TEM observation result of the obtained silicon compound-coated silicon-doped zinc oxide particles, and the molar ratio (Si/Zn) calculated from TEM-EDS analysis, together with the calculated value thereof from the prescriptions and introduction flow rates of the A-solution, B-solution, and C-solution, are listed. Here, of the molar ratios (Si/Zn) shown in Table 2, in the "Silicon-doped zinc oxide particle [calculated value]", the silicon to form the silicon-doped zinc oxide particle is included in the silicon compound-coated silicon-doped zinc oxide particle and the silicon-doped zinc oxide particle was calculated from the molar concentration of the silicon and zinc contained in the A-solution, in the "Silicon compound-coated silicon-doped zinc oxide particle [calculated value]", the molar ratio (Si/Zn) means the entire silicon compound-coated silicon-doped zinc oxide particle, and in TEM-EDS, the molar ratio (Si/Zn) of entire particles were calculated. The introduction temperatures (supply temperatures) and introduction pressures (supply pressures) of the A-solution, B-solution, and C-solution described in Table 2 were measured by using the thermometers and pressure meters installed in the sealed introduction paths to between the processing surfaces 1 and 2 (first introduction part d1, second introduction part d2, and third introduction part d3), wherein the introduction temperature of the A-solution in Table 2 is the actual temperature of the A-solution under the introduction pressure in the first introduction part d1, similarly, the introduction temperature of the B-solution is the actual temperature of the B-solution under the introduction pressure in the second introduction part d2, and the introduction temperature of the C-solution is the actual temperature of the C-solution under the introduction pressure in the third introduction part d3.

Measurement of pH was made by using a pH meter (catalogue No. D-51; manufactured by HORIBA, Ltd.). Before the A-solution, the B-solution, and the C-solution were introduced into the fluid processing apparatus, respective pHs of these solutions were measured at room temperature. It was difficult to measure a pH of the mixed fluid immediately after the silicon-doped zinc oxide raw material solution was mixed with the oxide separating solvent and a pH of the mixed fluid immediately after the after mixed solution in which he silicon-doped zinc oxide raw material solution was mixed with the silicon compound raw material solution; and thus, a pH of the silicon-doped zinc oxide raw material dispersion solution which was ejected from the apparatus and re in the beaker b was measured at room temperature.

From the silicon compound-coated iron oxide particle dispersion solution that was ejected from the fluid processing apparatus and recovered in the beaker b, the dried powder and wet cake sample thereof were prepared. The preparations thereof were made according to a method normally used in this kind of processing. The ejected silicon compound-coated iron oxide particle dispersion solution was re, and then, the silicon compound-coated iron oxide particles were allowed to settle so as to remove a supernatant thereof; thereafter, washing with 100 parts by weight of pure water and settling were repeated for three times, and then, washing with pure water and settling were repeated for three times so as to clean the silicon compound-coated iron oxide particle. Part of the finally obtained wet cake of the silicon compound-coated iron oxide particle was dried at 25° C. and −0.10 MPaG for 20 hours to obtain the product as the dried powder. The remaining product was used as the wet cake sample thereof.

Also, as shown in Tables 1 and 2, zinc oxide particle not coated with silicon compound and not doped with silicon was prepared without using C-solution and further by using the same apparatus not provided with the third introduction part d3. The same methods as those of Example 1-1 to Example 1-4 were used except for not using C-solution and not being provided with the third introduction part d3.

TABLE 1

|  |  |  | Example 1-1 | Example 1-2 | Example 1-3 | Example 1-4 | Comparative Example 1 |
|---|---|---|---|---|---|---|---|
| Prescription of the 1st fluid (A-solution) |  |  | Silicon-doped zinc oxide raw material solution | Silicon-doped zinc oxide raw material solution | Silicon-doped zinc oxide raw material solution | Silicon-doped zinc oxide raw material solution | Oxide raw material solution |
|  | Prescription | Raw material | $Zn(NO_3)_3 \cdot 6H_2O$ | $Zn(NO_3)_3 \cdot 6H_2O$ | $Zn(NO_3)_3 \cdot 6H_2O$ | $Zn(NO_3)_3 \cdot 6H_2O$ | $Zn(NO_3)_3 \cdot 6H_2O$ |
|  |  | [wt %] | 3.000 | 3.000 | 3.000 | 3.000 | 3.000 |
|  |  | Raw material | TEOS | TEOS | TEOS | TEOS | — |
|  |  | [wt %] | 0.128 | 0.178 | 0.367 | 0.790 | — |
|  |  | Raw material | 60 wt % HNO3 | 60 wt % HNO3 | 60 wt % HNO3 | 60 wt % HNO3 | — |
|  |  | [wt %] | 0.003 | 0.003 | 0.003 | 0.003 | — |
|  |  | Raw material | EG | EG | EG | EG | EG |
|  |  | [wt %] | 96.869 | 96.819 | 96.630 | 96.207 | 97.000 |
|  | pH | pH | 1.86 | 1.89 | 1.99 | 2.06 | 2.36 |
|  |  | [° C.] | 28.8 | 28.9 | 29.1 | 29.1 | 29.4 |
| Prescription of the 2nd fluid (B-solution) |  |  | Oxide separating solvent | Oxide separating solvent | Oxide separating solvent | Oxide separating solvent | Oxide separating solvent |
|  | Prescription | Raw material | NaOH | NaOH | NaOH | NaOH | NaOH |
|  |  | [wt %] | 9.00 | 9.00 | 9.00 | 9.00 | 9.00 |
|  |  | Raw material | Pure water | Pure water | Pure water | Pure water | Pure water |
|  |  | [wt %] | 91.00 | 91.00 | 91.00 | 91.00 | 91.00 |
|  | pH | pH | >14 | >14 | >14 | >14 | >14 |
|  |  | [° C.] | — | — | — | — | — |
| Prescription of the 3rd fluid (C-solution) | Prescription | Raw material | TEOS | TEOS | TEOS | TEOS | — |
|  |  | [wt %] | 0.7103 | 0.7103 | 0.7103 | 0.7103 | — |
|  |  | Raw material | MeOH | MeOH | MeOH | MeOH | — |
|  |  | [wt %] | 3.2897 | 3.2897 | 3.2897 | 3.2897 | — |
|  |  | Raw material | EG | EG | EG | EG | — |
|  |  | [wt %] | 96.0000 | 96.0000 | 96.0000 | 96.0000 | — |
|  | pH | pH | 6.29 | 6.29 | 6.29 | 6.29 | — |
|  |  | [° C.] | 27.1 | 27.1 | 27.1 | 27.1 | — |

TABLE 2

|  |  | Example 1-1 | Example 1-2 | Example 1-3 | Example 1-4 | Comparative Example 1 |
|---|---|---|---|---|---|---|
| Introduction flow rate (supply flow rate) [ml/min] | A-solution | 400 | 400 | 400 | 400 | 400 |
|  | B-solution | 37 | 37 | 37 | 37 | 38 |
|  | C-solution | 100 | 100 | 100 | 100 | — |
| Introduction temperature (supply temperature) [° C.] | A-solution | 201 | 200 | 199 | 200 | 202 |
|  | B-solution | 90 | 90 | 90 | 87 | 90 |
|  | C-solution | 60 | 60 | 60 | 60 | — |

TABLE 2-continued

|  |  | Example 1-1 | Example 1-2 | Example 1-3 | Example 1-4 | Comparative Example 1 |
|---|---|---|---|---|---|---|
| Introduction pressure (supply pressure) [MPaG] | A-solution | 0.153 | 0.149 | 0.150 | 0.151 | 0.149 |
|  | B-solution | 0.10 | 0.10 | 0.10 | 0.10 | 0.10 |
|  | C-solution | 0.10 | 0.10 | 0.10 | 0.10 | — |
| Discharged solution | pH | 9.19 | 9.11 | 9.16 | 9.21 | 9.23 |
|  | Temperature [° C.] | 26.1 | 26.1 | 25.9 | 25.4 | 27.1 |
| Molar ratio (Si/Zn) [molar ratio] | Silicon-doped zinc oxide particle [calculated value] | 0.06 | 0.08 | 0.17 | 0.38 | — |
|  | Silicon compound-coated silicon-doped zinc oxide particle [calculated value] | 0.15 | 0.17 | 0.26 | 0.46 | — |
|  | [EDS] | 0.15 | 0.17 | 0.26 | 0.46 | — |
| Average primary particle diameter [nm] |  | 8.86 | 8.79 | 8.87 | 8.69 | 8.46 |

FIG. 1 shows the STEM mapping results of the silicon compound-coated silicon-doped zinc oxide particle obtained in Example 1-1. FIG. 1 shows the mapping results of (a) a dark field image (HAADF image), (b) silicon (Si), (c) zinc (Zn), and (d) oxygen (O), respectively. Also, FIG. 2 shows the results of line analysis at the position indicated by the dotted line in the HAADF image of FIG. 1. As can be seen in FIG. 1, whereas the oxygen and the silicon are detected in the entire particle, the zinc is observed to have smaller particle diameter than oxygen and silicon, and it was thus found that a compound mainly composed of silicon is present on the surface of the particle. Further, as can be seen in the line analysis of FIG. 2, the silicon is detected not only at the surface of particle, but also there are sites where the large amount of silicon is detected in the central part, thus it was found that the silicon is not only present on the surface but also in the inside the particle thereof. Further it was found that the particle obtained in Example 1-1 was the silicon compound-coated silicon-doped zinc oxide particle containing silicon mainly on the surface of the particle as well as containing silicon, oxygen, and zinc in the entire of the particle. Similar results were also obtained in the silicon compound-coated silicon-doped zinc oxide particles obtained in Example 1-2, Example 1-3, and Example 1-4.

FIG. 5 shows the XRD measurement results of the silicon compound-coated silicon-doped zinc oxide particle obtained in Example 1-1 and the XRD measurement results of the zinc oxide particle obtained in Comparative Example 1. As can be seen in FIG. 5, in the XRD measurement results of the silicon compound-coated silicon-doped zinc oxide particle obtained in Example 1-1 and the zinc oxide particle obtained in Comparative Example 1, although ZnO peaks were detected in all cases, the peak in Example 1-1 was detected as broad peak as compared to Comparative Example 1, and it is considered that there is a possibility that strain was generated in ZnO crystals due to the incorporation of Si in inside of the particle. Similar XRD measurement results were also obtained in the silicon compound-coated silicon-doped zinc oxide particles obtained in Example 1-2, Example 1-3, and Example 1-4.

FIG. 6 shows the graph of the molar absorption coefficient calculated from the molar concentrations of the silicon-doped zinc oxide particle (calculated as ZnO+Si) in the dispersion solution used for the measurement of the absorption spectra of the dispersion solution in which the silicon compound-coated silicon-doped zinc oxide particles obtained in Example 1-1 to Example 1-4 and the zinc oxide particle obtained in Comparative Example 1 are dispersed in propylene glycol or the zinc oxide particle (calculated as ZnO) to the measurement wavelength. Also, in Table 3, the Si/Zn (molar ratio) and the average molar absorption coefficient in the wavelength of 200 nm to 380 nm of the silicon compound-coated silicon-doped zinc oxide particles obtained in Example 1-1 to Example 1-4 are shown together with the average molar absorption coefficient in the wavelength of 200 nm to 380 nm of the zinc oxide particle obtained in Comparative Example 1. Further, in Table 3, the increasing rate of the average molar absorption coefficient in the wavelength range of 200 nm to 380 nm (average molar absorption coefficient increasing rates) of the silicon compound-coated silicon-doped zinc oxide particles obtained in the respective Examples to the average molar absorption coefficient in the same wavelength region of Comparative Example 1 are indicated. FIG. 7 shows the measurement results of reflectance in the wavelength region of 200 nm to 2500 nm of the silicon compound-coated silicon-doped zinc oxide particles obtained in Example 1-1 to Example 1-4 and the zinc oxide particle obtained in Comparative Example 1. Also, in Table 3, the average reflectances in the wavelength region of 780 nm to 2500 nm of the silicon compound-coated silicon-doped zinc oxide particles obtained in Example 1-1 to Example 1-4 are shown. FIG. 8 shows the graph of the average reflectance in the wavelength region of 780 nm to 2500 nm to the molar ratio (Si/Zn) of the silicon compound-coated silicon-doped zinc oxide particles obtained in Example 1-1 to Example 1-4 and the zinc oxide particle obtained in Comparative Example 1. In the Regard to the Molar Ratios (Si/Zn), Both the Molar ratio (Si/Zn) of the silicon-doped zinc oxide particle constituting the inside of the particle and the molar ratio (Si/Zn) of the silicon compound-coated silicon-doped zinc oxide particle including the silicon compound were used. FIG. 9 shows the transmittance spectra of the dispersion solution in which the silicon compound-coated silicon-doped zinc oxide particles obtained in Example 1-1 and Examples 1-2 to 1-4 and the zinc oxide particle obtained in Comparative Example 1 are respectively dispersed in propylene glycol at a concentration of 0.011% by weight as ZnO+Si. Also, in Table 3, the average transmittance to the light beam in the wavelength of 380 nm to 780 nm to the transmittance spectra of the silicon compound-coated silicon-doped zinc oxide particles obtained in Examples 1-1 to 1-4 are indicated.

TABLE 3

| Example | | 1-1 | 1-2 | 1-3 | 1-4 | Comparative Example 1 |
|---|---|---|---|---|---|---|
| Si/Zn [molar ratio] | Silicon-doped zinc oxide particle | 0.06 | 0.08 | 0.17 | 0.38 | 0.00 |
| | Silicon compound-coated silicon-doped zinc oxide particle | 0.15 | 0.17 | 0.26 | 0.46 | 0.00 |
| Average molar absorption coefficient [L/(cm · mol)] (200-380 nm) | | 1043 | 1078 | 1136 | 1197 | 633 |
| Average molar absorption coefficient increasing rate [%] | | 165 | 170 | 179 | 189 | 100 |
| Average reflectance [%] (780-2500 nm) | | 82.6 | 76.3 | 65.5 | 56.5 | 71.2 |
| Average transmittance [%] (380-780 nm) | | 95.8 | 95.2 | 95.6 | 96.0 | 78.5 |

As can be seen from FIG. 6 and Table 3, there is a tendency that when by controlling the Si/Zn (molar ratio) so as to be higher (to increase), the average molar absorption coefficient in the wavelength of 200 nm to 380 nm is higher (increased). Also as can be seen in Table 3, the silicon compound-coated silicon-doped zinc oxide particles obtained in Example 1-1 to Example 1-4 are not only uncoated with the silicon compound, but also have extremely high average molar absorption coefficient in the wavelength of 200 nm to 380 nm as compared with the zinc oxide particle not being doped with silicon. It is preferable that in the silicon-doped zinc oxide particle of the present invention, the Si/Zn (molar ratio) contained in the silicon-doped zinc oxide particle be 0.01 or more and 0.50 or less, and in the dispersion solution in which the silicon-doped metal oxide particle is dispersed in a dispersion medium, the average molar absorption coefficient increasing rate in the wavelength range of 200 nm to 380 nm be 110% or more and the average molar absorption coefficient in the same range be 650 L/(mol·cm). By employing the silicon compound-coated silicon-doped zinc oxide particle for a paint used on glass, a composition for glass used as film-like, and a clear coating film, the composition for transparent material having high transparency imparted with an ultraviolet absorption ability can be provided.

As can be seen from FIG. 7, FIG. 8, and Table 3, there is a tendency that when by controlling the Si/Zn (molar ratio) so as to be lower (to decrease), the average reflectance in the wavelength region of 780 nm to 2500 nm is higher (increased).

When the molar ratio (Si/Zn) of the silicon-doped zinc oxide particle is less than 0.10 or when the molar ratio (Si/Zn) of the silicon compound-coated silicon-doped zinc oxide particle is in the range of less than 0.175 (for example, as in Example 1-1 or Example 1-2), the average reflectance in the wavelength region of 780 nm to 2500 nm is 75% or more and is also high as compared to the zinc oxide particle of the Comparative Example, therefore, the particle is suitable as transparent material having the property of being capable of enhancing the average molar absorption coefficient in the abovementioned ultraviolet region and the property of reflecting near-infrared rays which are heat rays. On the other hand, when the molar ratio (Si/Zn) of the silicon-doped zinc oxide particle is 0.10 or more or when the molar ratio (Si/Zn) of the silicon compound-coated silicon-doped zinc oxide particle is in a range of 0.175 or more (for example, as in Example 1-3 or Example 1-4), the average reflectance in the wavelength region of 780 nm to 2500 nm is less than 75% and the particles are suitable for the purpose of shielding the ultraviolet rays such as glass used for indoor spa, heated swimming pool, greenhouse, or agricultural film while allowing the transmission of near-infrared rays which are heat rays.

Further, it shows that the average transmittance in the wavelength region of 380 nm to 780 nm which is the visible region is higher than as compared to that of the Comparative Example and shows 90% or more, the transparency of the silicon compound-coated silicon-doped zinc oxide particle dispersion solutions of the present invention is extremely high. As described above, by employing the above-described silicon compound-coated silicon-doped zinc oxide particles in a composition for transparent material used as a paint or a film to be used on glass, a composition for transparent material hiving high transparency that is imparted with an ultraviolet absorption ability and/or a near-infrared reflection ability can be provided. Also, when a composition for transparent material is arranged to contain plural types of the silicon compound-coated silicon-doped zinc oxide particles that are controlled in the above properties and used as transparent materials such as a glass, a clear coating film, in addition to secure the transparency, the composition is suitable as the ultraviolet shielding agent having the ultraviolet absorption ability and/or the near-infrared shielding agent having the near-infrared reflection ability.

Example 2

As Example 2, the silicon compound-coated silicon-cobalt-doped zinc oxide particle in which at least part of the surface of the silicon-doped zinc oxide particle is coated with silicon compound further doped with cobalt in the silicon-doped zinc oxide particle is described. Other than the conditions indicated in Table 4 and Table 5, silicon compound-coated silicon-cobalt-doped zinc oxide particle was prepared by the same method that of Example 1. Meanwhile, the substances used here and represented by chemical formula or abbreviation described in Table 4 are: EG for ethylene glycol (manufactured by Kishida Chemical Co., Ltd.), $Zn(NO_3)_2 \cdot 6H_2O$ for zinc nitrate hexahydrate (manufactured by Wako Pure Chemical Industries, Ltd.), $Co(NO_3)_2 \cdot 6H_2O$ for cobalt nitrate hexahydrate (manufactured by Wako Pure Chemical Industries, Ltd.), NaOH for sodium hydroxide (manufactured by KANTO CHEMICAL CO., INC.), 60 wt % $HNO_3$ for concentrated nitric acid (manufactured by Kishida Chemical Co., Ltd.), and TEOS for tetraethyl orthosilicate (manufactured by Wako Pure Chemical Industries, Ltd.). The same evaluation as those of Example 1 was conducted in Example 2. The results are shown in Table 7.

TABLE 4

|  |  |  | Example 2-1 | Example 2-2 | Example 2-3 | Example 2-4 | Comparative Example 1 |
|---|---|---|---|---|---|---|---|
| Prescription of the 1st fluid (A-solution) |  |  | Silicon-doped zinc oxide raw material solution | Silicon-doped zinc oxide raw material solution | Silicon-doped zinc oxide raw material solution | Silicon-doped zinc oxide raw material solution | Oxide raw material solution |
|  | Prescription | Raw material | $Zn(NO_3)_2 \cdot 6H_2O$ | $Zn(NO_3)_3 \cdot 6H_2O$ | $Zn(NO_3)_3 \cdot 6H_2O$ | $Zn(NO_3)_3 \cdot 6H_2O$ | $Zn(NO_3)_3 \cdot 6H_2O$ |
|  |  | [wt %] | 3.0000 | 3.000 | 3.000 | 3.000 | 3.000 |
|  |  | Raw material | TEOS | TEOS | TEOS | TEOS | — |
|  |  | [wt %] | 0.128 | 0.178 | 0.367 | 0.790 | — |
|  |  | Raw material | $Co(NO_3)_3 \cdot 6H_2O$ | $Co(NO_3)_3 \cdot 6H_2O$ | $Co(NO_3)_3 \cdot 6H_2O$ | $Co(NO_3)_3 \cdot 6H_2O$ | — |
|  |  | [wt %] | 0.3650 | 0.3650 | 0.3650 | 0.3650 | — |
|  |  | Raw material | EG | EG | EG | EG | EG |
|  |  | [wt %] | 99.507 | 96.457 | 96.268 | 95.845 | 97.000 |
|  | pH | pH | 3.87 | 3.67 | 3.69 | 3.79 | 2.36 |
|  |  | [° C.] | 23.1 | 24.1 | 23.6 | 23.5 | 29.4 |
| Prescription of the 2nd fluid (B-solution) |  |  | Oxide separating solvent | Oxide separating solvent | Oxide separating solvent | Oxide separating solvent | Oxide separating solvent |
|  | Prescription | Raw material | NaOH | NaOH | NaOH | NaOH | NaOH |
|  |  | [wt %] | 9.00 | 9.00 | 9.00 | 9.00 | 9.00 |
|  |  | Raw material | Pure water | Pure water | Pure water | Pure water | Pure water |
|  |  | [wt %] | 91.00 | 91.00 | 91.00 | 91.00 | 91.00 |
|  | pH | pH | >14 | >14 | >14 | >14 | >14 |
|  |  | [° C.] | — | — | — | — | — |
| Prescription of the 3rd fluid (C-solution) | Prescription | Raw material | TEOS | TEOS | TEOS | TEOS | — |
|  |  | [wt %] | 0.5678 | 0.5678 | 0.5678 | 0.5678 | — |
|  |  | Raw material | MeOH | MeOH | MeOH | MeOH | — |
|  |  | [wt %] | 3.2897 | 3.2897 | 3.2897 | 3.2897 | — |
|  |  | Raw material | EG | EG | EG | EG | — |
|  |  | [wt %] | 96.1425 | 96.1425 | 96.1425 | 96.1425 | — |
|  | pH | pH | 6.55 | 6.59 | 6.54 | 6.59 | — |
|  |  | [° C.] | 27.1 | 27.1 | 27.1 | 27.1 | — |

TABLE 5

|  |  | Example 2-1 | Example 2-2 | Example 2-3 | Example 2-4 | Comparative Example 1 |
|---|---|---|---|---|---|---|
| Introduction flow rate (supply flow rate) [ml/min] | A-solution | 400 | 400 | 400 | 400 | 400 |
|  | B-solution | 40 | 40 | 40 | 40 | 38 |
|  | C-solution | 100 | 100 | 100 | 100 | — |
| Introduction temperature (supply temperature) [° C.] | A-solution | 201 | 200 | 199 | 200 | 202 |
|  | B-solution | 90 | 90 | 90 | 87 | 90 |
|  | C-solution | 60 | 60 | 60 | 60 | — |
| Introduction pressure (supply pressure) [MPaG] | A-solution | 0.234 | 0.233 | 0.239 | 0.239 | 0.149 |
|  | B-solution | 0.10 | 0.10 | 0.10 | 0.10 | 0.10 |
|  | C-solution | 0.10 | 0.10 | 0.10 | 0.10 | — |
| Discharged solution | pH | 10.69 | 10.79 | 10.76 | 10.39 | 9.23 |
|  | Temperature [° C.] | 26.1 | 26.1 | 25.9 | 25.4 | 27.1 |
| Molar ratio (Si/Zn) [molar ratio] | Silicon-doped zinc oxide particle [calculated value] | 0.06 | 0.08 | 0.17 | 0.38 | — |
|  | Silicon compound-coated silicon-doped zinc oxide particle [calculated value] | 0.13 | 0.15 | 0.24 | 0.44 | — |
|  | [EDS] | 0.13 | 0.15 | 0.24 | 0.44 | — |
| Average primary particle diameter [nm] |  | 9.76 | 9.69 | 9.84 | 9.79 | 8.46 |

TABLE 6

| Example | | 2-1 | 2-2 | 2-3 | 2-4 | Comparative Example 1 |
|---|---|---|---|---|---|---|
| Si/Zn [molar ratio] | Silicon-doped zinc oxide particle | 0.06 | 0.08 | 0.17 | 0.38 | 0.00 |
| | Silicon compound-coated silicon-doped zinc oxide particle | 0.13 | 0.15 | 0.24 | 0.44 | 0.00 |
| Average molar absorption coefficient [L/(cm · mol)] (200-380 nm) | | 854 | 912 | 954 | 1123 | 633 |
| Average molar absorption coefficient increasing rate [%] | | 135 | 144 | 151 | 177 | 100 |
| Average reflectance [%] (780-2500 nm) | | 76.3 | 73.4 | 66.9 | 53.1 | 71.2 |
| Average transmittance [%] (380-780 nm) | | 93.1 | 92.4 | 93.6 | 93.4 | 78.5 |

As can be seen in Table 6, the same conclusion as those of Example 1 was obtained even in the case where the silicon-doped zinc oxide particle is the silicon-cobalt-doped zinc oxide particle. Also, the silicon-cobalt-doped zinc oxide particle obtained in Example 2 exhibits the color from light blue to blue, and the range of the color can be controlled by controlling the amount of cobalt contained in the silicon-cobalt-doped zinc oxide particle, therefore, when used in a composition for transparent material, the particle is suitable for a purpose of coloring in the blue color or the light blue color or the like in addition to having ultraviolet and/or near-infrared shielding properties.

Example 3

As Example 3, the silicon compound-coated silicon-iron-doped zinc oxide particle in which at least part of the surface of the silicon-doped zinc oxide particle is coated with silicon compound further doped with iron in the silicon-doped zinc oxide particle is described.

Other than the conditions indicated in Table 7 and Table 8, silicon compound-coated silicon-iron-doped zinc oxide particle was prepared by the same method that of Example 1. Meanwhile, the substances used here and represented by chemical formula or abbreviation described in Table 7 are: EG for ethylene glycol (manufactured by Kishida Chemical Co., Ltd.), $Zn(NO_3)_2 \cdot 6H_2O$ for zinc nitrate hexahydrate (manufactured by Wako Pure Chemical Industries, Ltd.), $Fe(NO_3)_2 \cdot 9H_2O$ for iron nitrate nonahydrate (manufactured by Wako Pure Chemical Industries, Ltd.), NaOH for sodium hydroxide (manufactured by KANTO CHEMICAL CO., INC.), 60 wt % $HNO_3$ for concentrated nitric acid (manufactured by Kishida Chemical Co., Ltd.), and TEOS for tetraethyl orthosilicate (manufactured by Wako Pure Chemical Industries, Ltd.). The same evaluation as those of Example 1 was conducted in Example 3. The results are shown in Table 9.

TABLE 7

| | | | Example 3-1 | Example 3-2 | Example 3-3 | Example 3-4 | Comparative Example 1 |
|---|---|---|---|---|---|---|---|
| Prescription of the 1st fluid (A-solution) | | | Silicon-doped zinc oxide raw material solution | Silicon-doped zinc oxide raw material solution | Silicon-doped zinc oxide raw material solution | Silicon-doped zinc oxide raw material solution | Oxide raw material solution |
| | Prescription | Raw material | $Zn(NO_3)_2 \cdot 6H_2O$ | $Zn(NO_3)_3 \cdot 6H_2O$ | $Zn(NO_3)_3 \cdot 6H_2O$ | $Zn(NO_3)_3 \cdot 6H_2O$ | $Zn(NO_3)_3 \cdot 6H_2O$ |
| | | [wt %] | 3.0000 | 3.000 | 3.000 | 3.000 | 3.000 |
| | | Raw material | TEOS | TEOS | TEOS | TEOS | — |
| | | [wt %] | 0.128 | 0.178 | 0.367 | 0.790 | — |
| | | Raw material | $Fe(NO_3)_3 \cdot 9H_2O$ | $Fe(NO_3)_3 \cdot 9H_2O$ | $Fe(NO_3)_3 \cdot 9H_2O$ | $Fe(NO_3)_3 \cdot 9H_2O$ | — |
| | | [wt %] | 0.1280 | 0.1280 | 0.1280 | 0.1280 | — |
| | | Raw material | EG | EG | EG | EG | EG |
| | | [wt %] | 99.744 | 96.694 | 96.505 | 96.082 | 97.000 |
| | pH | pH | 3.87 | 3.67 | 3.69 | 3.79 | 2.36 |
| | | [° C.] | 23.1 | 24.1 | 23.6 | 23.5 | 29.4 |
| Prescription of the 2nd fluid (B-solution) | | | Oxide separating solvent | Oxide separating solvent | Oxide separating solvent | Oxide separating solvent | Oxide separating solvent |
| | Prescription | Raw material | NaOH | NaOH | NaOH | NaOH | NaOH |
| | | [wt %] | 9.00 | 9.00 | 9.00 | 9.00 | 9.00 |
| | | Raw material | Pure water | Pure water | Pure water | Pure water | Pure water |
| | | [wt %] | 91.00 | 91.00 | 91.00 | 91.00 | 91.00 |
| | pH | pH | >14 | >14 | >14 | >14 | >14 |
| | | [° C.] | — | — | — | — | — |

TABLE 7-continued

|  |  |  | Example 3-1 | Example 3-2 | Example 3-3 | Example 3-4 | Comparative Example 1 |
|---|---|---|---|---|---|---|---|
| Prescription of the 3rd fluid (C-solution) | Prescription | Raw material [wt %] | TEOS 0.7694 | TEOS 0.7694 | TEOS 0.7694 | TEOS 0.7694 | — — |
|  |  | Raw material [wt %] | MeOH 3.2897 | MeOH 3.2897 | MeOH 3.2897 | MeOH 3.2897 | — — |
|  |  | Raw material [wt %] | EG 95.9409 | EG 95.9409 | EG 95.9409 | EG 95.9409 | — — |
|  | pH | pH | 6.55 | 6.59 | 6.54 | 6.59 | — |
|  |  | [° C.] | 27.1 | 27.1 | 27.1 | 27.1 | — |

TABLE 8

|  |  | Example 3-1 | Example 3-2 | Example 3-3 | Example 3-4 | Comparative Example 1 |
|---|---|---|---|---|---|---|
| Introduction flow rate (supply flow rate) [ml/min] | A-solution | 400 | 400 | 400 | 400 | 400 |
|  | B-solution | 40 | 40 | 40 | 40 | 38 |
|  | C-solution | 100 | 100 | 100 | 100 | — |
| Introduction temperature (supply temperature) [° C.] | A-solution | 201 | 200 | 199 | 200 | 202 |
|  | B-solution | 90 | 90 | 90 | 87 | 90 |
|  | C-solution | 60 | 60 | 60 | 60 | — |
| Introduction pressure (supply pressure) [MPaG] | A-solution | 0.316 | 0.331 | 0.336 | 0.326 | 0.149 |
|  | B-solution | 0.10 | 0.10 | 0.10 | 0.10 | 0.10 |
|  | C-solution | 0.10 | 0.10 | 0.10 | 0.10 | — |
| Discharged solution | pH | 11.12 | 11.31 | 11.34 | 11.36 | 9.23 |
|  | Temperature [° C.] | 21.2 | 21.3 | 21.6 | 22.9 | 27.1 |
| Molar ratio (Si/Zn) [molar ratio] | Silicon-doped zinc oxide particle [calculated value] | 0.06 | 0.08 | 0.17 | 0.38 | — |
|  | Silicon compound-coated silicon-doped zinc oxide particle [calculated value] | 0.15 | 0.18 | 0.27 | 0.47 | — |
|  | [EDS] | 0.15 | 0.18 | 0.27 | 0.47 | — |
| Average primary particle diameter [nm] |  | 8.96 | 8.64 | 8.49 | 8.58 | 8.46 |

TABLE 9

| Example |  | 3-1 | 3-2 | 3-3 | 3-4 | Comparative Example 1 |
|---|---|---|---|---|---|---|
| Si/Zn [molar ratio] | Silicon-doped zinc oxide particle | 0.06 | 0.08 | 0.17 | 0.38 | 0.00 |
|  | Silicon compound-coated silicon-doped zinc oxide particle | 0.15 | 0.18 | 0.27 | 0.47 | 0.00 |
| Average molar absorption coefficient [L/(cm · mol)] (200-380 nm) |  | 1234 | 1331 | 1431 | 1555 | 633 |
| Average molar absorption coefficient increasing rate [%] |  | 195 | 210 | 226 | 246 | 100 |
| Average reflectance [%] (780-2500 nm) |  | 83.6 | 79.4 | 74.3 | 72.9 | 71.2 |
| Average transmittance [%] (380-780 nm) |  | 95.6 | 95.4 | 95.3 | 95.7 | 78.5 |

As can be seen in Table 9, the same conclusion as those of Example 1 was obtained even in the case where the silicon-doped zinc oxide particle is the silicon-iron-doped zinc oxide particle. Also, the silicon-iron-doped zinc oxide particle obtained in Example 3 exhibits the color from yellow to red and the range of the color can be controlled by controlling the amount of iron contained in the silicon-iron-doped zinc oxide particle, therefore, when used in a composition for transparent material, the particle is suitable for a purpose of coloring in the yellow color or the red color or the like in addition to having ultraviolet and/or near-infrared shielding properties.

Example 4

As Example 4, results of heat treatment of the silicon compound-coated silicon-doped zinc oxide particle which is coated with a silicon compound obtained in Example 1-1 are shown. The silicon compound-coated silicon-doped zinc oxide particle obtained in Example 1-1 was subjected to a heat treatment using an electric furnace as the changing treatment of the functional group included in the silicon compound-coated silicon-doped zinc oxide particles. The heat treatment conditions thereof were: 200° C. in Example 4-1, 300° C. in Example 4-3, 400° C. in Example 4-4, wherein the period of the heat treatment was 30 minutes in all the heat treatment temperatures. In Table 10, the results of the respective Examples are shown together with ratio of the M-OH bond and the ratio of the Si—OH bond.

of the silicon (Si) to the zinc (Zn) in the vicinity of the surface layer compared to the inside of the silicon compound-coated silicon-doped zinc oxide particle. Also, a tendency that the atomic % at which the silicon is detected in the vicinity of the surface layer increases as compared to the inside of the silicon compound-coated silicon-doped zinc oxide particles in the order of Example 1, Examples 4-1, 4-2, 4-3, and 4-4 was seen, and as can be seen in this together with the results of Table 10, it was also found that there is a possibility that by controlling the molar ratio (Si/Zn) in the vicinity of the surface layer to the inside of the silicon compound-coated silicon-doped zinc oxide particle so as to be high, in other word, by changing the silicon in inside of the particle to the one for coating the surface of the particle, the average reflectance in the wavelength region of 780 nm to 2500 nm of the silicon compound-coated silicon-doped zinc oxide particle can be controlled so as to be higher (to increase) and the average molar absorption coefficient in the wavelength region of 200 nm to 380 nm of the particle can be controlled so as to be higher (to increase).

Example 5

In Example 5, the silicon-doped zinc oxide particle was prepared with the same condition as those of Example 1 except that the apparatus and the method for mixing and reaction of the A-solution (silicon-doped zinc oxide raw material solution), B-solution (oxide separating solvent), and C-Solution (silicon compound raw material solution) that were described in Japanese Patent Laid-Open Publica-

TABLE 10

| Example | | 4-1 | 4-2 | 4-3 | 4-4 | Comparative Example 1 |
|---|---|---|---|---|---|---|
| Si/Zn [molar ratio] | Silicon-doped zinc oxide particle | 0.06 | 0.06 | 0.06 | 0.06 | 0.00 |
| | Silicon compound-coated silicon-doped zinc oxide particle | 0.15 | 0.15 | 0.15 | 0.15 | 0.00 |
| Ratio of M—OH bond [%] | | 37.9 | 35.4 | 31.4 | 28.4 | — |
| Ratio of Si—OH bond [%] | | 44.6 | 38.4 | 35.6 | 31.1 | — |
| Average molar absorption coefficient [L/(cm · mol)] (200-380 nm) | | 1069 | 1132 | 1143 | 1201 | 633 |
| Average molar absorption coefficient increasing rate [%] | | 169 | 179 | 181 | 190 | 100 |
| Average reflectance [%] (780-2500 nm) | | 83.1 | 83.6 | 84.2 | 84.9 | 71.2 |
| Average transmittance [%] (380-780 nm) | | 94.9 | 94.6 | 94.8 | 94.1 | 78.5 |

As can be seen in Table 10, in the present invention, it was found that the ultraviolet absorption ability and the near-infrared reflection ability can be controlled by controlling the amount of hydroxyl group contained in the silicon compound-coated silicon-doped zinc oxide particle as well. Also, FIG. 3 shows the STEM mapping results of the silicon-oxide-coated, silicon-doped zinc oxide particle obtained in Example 4-4, and FIG. 4 shows the line analysis results at the position of the dotted line in the HAADF image of FIG. 3. As can be seen in FIGS. 3 and 4, silicon which is considered to be derived from the silicon compound is mainly detected on the surface of particle obtained in Example 4-4, and the silicon and the zinc are detected randomly in inside of the particle, however, unlike to Example 1-1, a part where the silicon is not detected is seen in the inside of the particle. That is, as compared with the silicon compound-coated silicon-doped zinc oxide particle obtained in Example 1-1, it was found that the silicon compound-coated silicon-doped zinc oxide particle is controlled so as to be higher (increase) the molar ratio (Si/Zn)

tion No. 2009-112892 were used. Meanwhile, the apparatus described in Japanese Patent Laid-Open Publication No. 2009-112892 is the apparatus described in FIG. 1 of the said gazette, wherein the inner diameter of the stirring vessel was 80 mm, the clearance between the outer edge of the stirring tool and the inner circumferential surface of the stirring vessel was 0.5 mm, and the rotation number of the stirring blade was 7200 rpm. The A-solution was introduced into the stirring vessel; and then, the B-solution was added into a thin film formed of the A-solution being pressed to the inner circumferential surface of the stirring vessel so as to mix them and react them. As a result of the TEM observation, the silicon compound-coated silicon-doped zinc oxide particles having the primary particle diameter of about 20 nm to 30 nm were observed. Also, in a manner similar to Comparative Example 1, the zinc oxide particle of the same particle diameter that is not doped with silicon was prepared (Comparative Example 2).

In STEM mapping results and line analysis of the silicon-doped zinc oxide particle obtained in Example 5-1 to Example 5-4, it was found that, as with Example 1, the particle obtained are silicon-doped zinc oxide particle in which the silicon is mainly detected at the particle surface as well as silicon, oxygen, and zinc are contained in the entire of the particle (not shown). Also, in XRD measurement results of the silicon-doped zinc oxide particles obtained in Example 5-1 to Example 5-4 and XRD measurement results of the zinc oxide particles obtained in Comparative Example 2, although ZnO peaks were detected in all cases, the peaks in Example 5-1 to Example 5-4 were detected as broad peaks as compared to Comparative Example 2, and it is considered that there is a possibility that strain was generated in ZnO crystals due to the incorporation of Si in inside of the particle (not shown).

In table 11, the results of the evaluation of the silicon-doped zinc oxide particles obtained in Example 5-1 to Example 5-4 in the same manner as in Example 1 are shown.

TABLE 11

| Example | | 5-1 | 5-2 | 5-3 | 5-4 | Comparative Example 2 |
|---|---|---|---|---|---|---|
| Si/Zn [molar ratio] | Silicon-doped zinc oxide particle | 0.06 | 0.08 | 0.17 | 0.38 | 0.00 |
| | Silicon compound-coated silicon-doped zinc oxide particle | 0.15 | 0.17 | 0.26 | 0.46 | 0.00 |
| Average molar absorption coefficient [L/(cm · mol)] (200-380 nm) | | 721 | 741 | 811 | 897 | 633 |
| Average molar absorption coefficient increasing rate [%] | | 114 | 117 | 128 | 142 | 100 |
| Average reflectance [%] (780-2500 nm) | | 71.9 | 68.4 | 64.3 | 55.4 | 71.2 |
| Average transmittance [%] (380-780 nm) | | 91.2 | 92.3 | 91.6 | 90.9 | 78.5 |

As can be seen Table 11, unlike Example 1, the same conclusion as those of Example 1 could be obtained even when the silicon compound-coated silicon-doped zinc oxide particle were prepared using an apparatus different from the apparatus described in Patent Document 6 or 7.

The invention claimed is:

1. An ultraviolet and/or near-infrared shielding agent composition for transparent material, wherein
the ultraviolet and/or near-infrared shielding agent composition for transparent material is used for a purpose of shielding ultraviolet rays and/or near-infrared rays,
wherein the ultraviolet and/or near-infrared shielding agent composition contains silicon compound-coated silicon-doped zinc oxide particle in which at least part of a surface of silicon-doped zinc oxide particle is coated with a silicon compound,
wherein the silicon compound contains an amorphous silicon oxide.

2. The ultraviolet and/or near-infrared shielding agent composition for transparent material according to claim 1, wherein
the ultraviolet and/or near-infrared shielding agent composition for transparent material is an ultraviolet and/or near-infrared shielding agent composition for glass.

3. The ultraviolet and/or near-infrared shielding agent composition for transparent material according to claim 2, wherein
the silicon compound-coated silicon-doped zinc oxide particle is the silicon compound-coated silicon-doped zinc oxide particle in which a molar ratio (Si/Zn) of zinc (Zn) and silicon (Si) in the silicon-doped zinc oxide particle is controlled so as to be increased, wherein
the silicon compound-coated silicon-doped zinc oxide particle is controlled so as to increase an average molar absorption coefficient in a wavelength region of 200 nm to 380 nm of a dispersion solution in which the silicon compound-coated silicon-doped zinc oxide particle is dispersed in a dispersion medium.

4. The ultraviolet and/or near-infrared shielding agent composition for transparent material according to claim 2, wherein
the silicon compound-coated silicon-doped zinc oxide particle is the silicon compound-coated silicon-doped zinc oxide particle in which the molar ratio (Si/Zn) of zinc (Zn) and silicon (Si) in the silicon-doped zinc oxide particle is controlled so as to be decreased, wherein
the silicon compound-coated silicon-doped zinc oxide particle is controlled so as to increase an average reflectance in a wavelength region of 780 nm to 2500 nm of the silicon compound-coated silicon-doped zinc oxide particle.

5. The ultraviolet and/or near-infrared shielding agent composition for transparent material according to claim 2, comprising at least two kinds of the silicon compound-coated silicon-doped zinc oxide particles in which a molar ratio (Si/Zn) of zinc (Zn) and silicon (Si) in the silicon-doped zinc oxide particles is different.

6. The ultraviolet and/or near-infrared shielding agent composition for transparent material according to claim 1, wherein
the ultraviolet and/or near-infrared shielding agent composition for transparent material is an ultraviolet and/or near-infrared shielding agent composition for clear coating film.

7. The ultraviolet and/or near-infrared shielding agent composition for transparent material according to claim 6, wherein
the silicon compound-coated silicon-doped zinc oxide particle is the silicon compound-coated silicon-doped zinc oxide particle in which a molar ratio (Si/Zn) of zinc (Zn) and silicon (Si) in the silicon-doped zinc oxide particle is controlled so as to be increased, wherein the silicon compound-coated silicon-doped zinc oxide particle is controlled so as to increase an average molar absorption coefficient in a wavelength region of 200 nm to 380 nm of a dispersion solution in which the silicon compound-coated silicon-doped zinc oxide particle is dispersed in a dispersion medium.

8. The ultraviolet and/or near-infrared shielding agent composition for transparent material according to claim 6, wherein
the silicon compound-coated silicon-doped zinc oxide particle is the silicon compound-coated silicon-doped zinc oxide particle in which the molar ratio (Si/Zn) of zinc (Zn) and silicon (Si) in the silicon-doped zinc oxide particle is controlled so as to be decreased, wherein
the silicon compound-coated silicon-doped zinc oxide particle is controlled so as to increase an average reflectance in a wavelength region of 780 nm to 2500 nm of the silicon compound-coated silicon-doped zinc oxide particle.

9. The ultraviolet and/or near-infrared shielding agent composition for transparent material according to claim 6, comprising at least two kinds of the silicon compound-coated silicon-doped zinc oxide particles in which a molar ratio (Si/Zn) of zinc (Zn) and silicon (Si) in the silicon-doped zinc oxide particles is different.

10. The ultraviolet and/or near-infrared shielding agent composition for transparent material according to claim 1, wherein
the silicon compound-coated silicon-doped zinc oxide particle is the silicon compound-coated silicon-doped zinc oxide particle in which a molar ratio (Si/Zn) of zinc (Zn) and silicon (Si) in the silicon-doped zinc oxide particle is controlled so as to be increased, wherein
the silicon compound-coated silicon-doped zinc oxide particle is controlled so as to increase an average molar absorption coefficient in a wavelength region of 200 nm to 380 nm of a dispersion solution in which the silicon compound-coated silicon-doped zinc oxide particle is dispersed in a dispersion medium.

11. The ultraviolet and/or near-infrared shielding agent composition for transparent material according to claim 10, comprising at least two kinds of the silicon compound-coated silicon-doped zinc oxide particles in which a molar ratio (Si/Zn) of zinc (Zn) and silicon (Si) in the silicon-doped zinc oxide particles is different.

12. The ultraviolet and/or near-infrared shielding agent composition for transparent material according to claim 1, wherein
the silicon compound-coated silicon-doped zinc oxide particle is the silicon compound-coated silicon-doped zinc oxide particle in which the molar ratio (Si/Zn) of zinc (Zn) and silicon (Si) in the silicon-doped zinc oxide particle is controlled so as to be decreased, wherein
the silicon compound-coated silicon-doped zinc oxide particle is controlled so as to increase an average reflectance in a wavelength region of 780 nm to 2500 nm of the silicon compound-coated silicon-doped zinc oxide particle.

13. The ultraviolet and/or near-infrared shielding agent composition for transparent material according to claim 1, comprising at least two kinds of the silicon compound-coated silicon-doped zinc oxide particles in which a molar ratio (Si/Zn) of zinc (Zn) and silicon (Si) in the silicon-doped zinc oxide particles is different.

14. The ultraviolet and/or near-infrared shielding agent composition for transparent material according to claim 1, wherein
the silicon compound-coated silicon-doped zinc oxide particle is the silicon compound-coated silicon-doped zinc oxide particle that is controlled so as to be decreased a ratio of M-OH bond, which is bonding of one or two or more different elements (M) other than oxygen or hydrogen with hydroxyl group (OH), contained in the silicon compound-coated silicon-doped zinc oxide particle, or a ratio of Si—OH bond, which is bonding of silicon (Si) with hydroxyl group (OH) contained in the silicon compound, and
the silicon compound-coated silicon-doped zinc oxide particle is controlled so as to be increased at least any of an average reflectance in a wavelength region of 780 nm to 2500 nm or an average molar absorption coefficient in a wavelength region of 200 nm to 380 nm of a dispersion solution, in which the silicon compound-coated silicon-doped zinc oxide particle is dispersed in a dispersion medium.

15. The ultraviolet and/or near-infrared shielding agent composition for transparent material according to claim 14, wherein
the ratio of the M-OH bond is calculated by waveform separation of peak derived from silicon compound-coated silicon-doped zinc oxide at wavenumbers of 100 $cm^{-1}$ to 1250 $cm^{-1}$ in an infrared absorption spectrum and
the silicon compound-coated silicon-doped zinc oxide particle is silicon compound-coated silicon-doped zinc oxide particle that is controlled of a ratio of an area of a peak derived from the M-OH bond, which is waveform-separated, to a total area of the respective waveform-separated peaks.

16. The ultraviolet and/or near-infrared shielding agent composition for transparent material according to claim 14, wherein
the ratio of the Si—OH bond is calculated by waveform separation of peak derived from silicon compound at wavenumbers of 800 $cm^{-1}$ to 1250 $cm^{-1}$ in an infrared absorption spectrum and
the silicon compound-coated silicon-doped zinc oxide particle is silicon compound-coated silicon-doped zinc oxide particle that is controlled of a ratio of an area of a peak derived from the Si—OH bond, which is waveform-separated, to a total area of the respective waveform-separated peaks.

17. The ultraviolet and/or near-infrared shielding agent composition for transparent material according to claim 14, wherein
the silicon compound-coated silicon-doped zinc oxide particle is silicon compound-coated silicon-doped zinc oxide particle being controlled of the ratio of the M-OH bond or the ratio of the Si—OH bond contained in the silicon compound-coated silicon-doped zinc oxide particle under a state of a dispersion body in which the silicon compound-coated silicon-doped zinc oxide particle is dispersed in a dispersion medium.

18. The ultraviolet and/or near-infrared shielding agent composition for transparent material according to claim 17, wherein
the dispersion body is a coating film, a film form, or a glass, and is heat-treated, wherein the silicon compound-coated silicon-doped zinc oxide particle is the silicon compound-coated silicon-doped zinc oxide particle in which the average reflectance or the average molar absorption coefficient is controlled by the heat treatment.

19. The ultraviolet and/or near-infrared shielding agent composition for transparent material according to claim 1, wherein the silicon compound-coated silicon-doped zinc oxide particle is the silicon compound-coated silicon-doped zinc oxide particle in which at least part of the surface of a single silicon-doped zinc oxide particle or the surface of an agglomerate body formed by aggregation of plural silicon-doped zinc oxide particles is coated with silicon compound, and the silicon compound-coated silicon-doped zinc oxide particle is the silicon compound-coated silicon-doped zinc oxide particle in which a particle diameter of the silicon-doped zinc oxide particle or the aggregate body of the silicon-doped zinc oxide particles is 1 nm or more and 100 nm or less.

* * * * *